US012726852B2

(12) United States Patent
Parida et al.

(10) Patent No.: US 12,726,852 B2
(45) Date of Patent: Sep. 1, 2026

(54) BANDWIDTH THROTTLING DETECTION IN WIRELESS NETWORKS

(71) Applicant: Samsung Electronics Co., Ltd., Suwon-si (KR)

(72) Inventors: Priyabrata Parida, Dallas, TX (US); Vutha Va, Plano, TX (US); Anum Ali, Frisco, TX (US); Yuqiang Heng, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 18/778,734

(22) Filed: Jul. 19, 2024

(65) Prior Publication Data

US 2025/0039735 A1 Jan. 30, 2025

Related U.S. Application Data

(60) Provisional application No. 63/529,302, filed on Jul. 27, 2023.

(51) Int. Cl.

| | |
|---|---|
| ***G06F 15/16*** | (2006.01) |
| ***H04W 28/02*** | (2009.01) |
| ***H04W 28/086*** | (2023.01) |

(52) U.S. Cl.

CPC ... *H04W 28/0284* (2013.01); *H04W 28/0278* (2013.01); *H04W 28/0865* (2023.05)

(58) Field of Classification Search

CPC ......... H04W 28/0284; H04W 28/0278; H04W 28/0865

See application file for complete search history.

(56) References Cited

U.S. PATENT DOCUMENTS

| | | | | |
|---|---|---|---|---|
| 6,701,272 | B2 | 3/2004 | Cooper et al. | |
| 10,638,335 | B2 * | 4/2020 | Jacinto | H04W 16/22 |
| 2010/0302946 | A1 * | 12/2010 | Yang | H04L 47/30 370/235 |
| 2013/0339530 | A1 * | 12/2013 | Nishioka | H04L 47/762 709/226 |
| 2014/0068076 | A1 * | 3/2014 | Dasher | H04L 65/612 709/226 |
| 2015/0009825 | A1 * | 1/2015 | Cha | H04L 61/5007 370/235 |
| 2015/0067183 | A1 * | 3/2015 | Cha | H04L 47/20 709/228 |

(Continued)

FOREIGN PATENT DOCUMENTS

| | | |
|---|---|---|
| CN | 114448811 A | 5/2022 |
| CN | 116437373 A | 7/2023 |
| CN | 117729164 A | 3/2024 |

*Primary Examiner* — Razu A Miah

(57) ABSTRACT

A UE includes a transceiver. The transceiver is configured to perform network activity for the UE. The UE further includes a processor operably coupled to the transceiver. The processor is configured to determine whether a change in network activity for the UE exceeds a metric, and upon determination that the metric is exceed, initiate an anomalous event detection process, and determine whether an anomalous event is detected. The processor is further configured to, upon detection of an anomalous event, determine a network load level, and modify, based on the determined network load level, a connection configuration of the UE.

20 Claims, 19 Drawing Sheets

(56) References Cited

U.S. PATENT DOCUMENTS

| | | | | |
|---|---|---|---|---|
| 2016/0007226 | A1* | 1/2016 | Kim | H04L 43/0888 370/254 |
| 2018/0109981 | A1* | 4/2018 | Henderson | H04W 36/22 |
| 2019/0182125 | A1* | 6/2019 | Neisinger | H04L 41/147 |
| 2019/0246182 | A1* | 8/2019 | Galecki | H04L 65/612 |
| 2019/0313318 | A1* | 10/2019 | Pawar | H04M 15/62 |
| 2019/0335342 | A1* | 10/2019 | Jacinto | H04W 24/02 |
| 2020/0221344 | A1* | 7/2020 | Jeon | H04W 28/0278 |
| 2021/0218675 | A1* | 7/2021 | Hannu | H04L 47/12 |
| 2021/0392548 | A1* | 12/2021 | Mallikarjunan | H04W 28/0257 |
| 2021/0400686 | A1* | 12/2021 | Aksu | H04W 72/535 |
| 2022/0264371 | A1* | 8/2022 | Strasman | H04L 47/28 |
| 2022/0312269 | A1* | 9/2022 | Saker | H04M 15/8228 |
| 2023/0038198 | A1* | 2/2023 | Lewis | H04L 41/5019 |
| 2023/0397014 | A1* | 12/2023 | Manapragada | H04W 16/26 |

* cited by examiner

500

BANDWIDTH THROTTLING DETECTION IN WIRELESS NETWORKS

CROSS-REFERENCE TO RELATED APPLICATION(S) AND CLAIM OF PRIORITY

This application claims priority under 35 U.S.C. § 119(e) to U.S. Provisional Patent Application No. 63/529,302 filed on Jul. 27, 2023. The above-identified provisional patent application is hereby incorporated by reference in its entirety.

TECHNICAL FIELD

This disclosure relates generally to wireless networks. More specifically, this disclosure relates to bandwidth throttling detection.

BACKGROUND

As the adoption of the 5G cellular communications is increasing, 5G network operators are grappling with meeting the traffic demand, especially during peak network traffic, to avoid network congestion. For fair resource allocation across users, many operators may opt for "bandwidth throttling" for UEs that persistently request large amounts of data during these peak traffic periods. In another scenario, network operators may throttle the bandwidth to prioritize critical traffic over regular traffic. In a third scenario, the operators may set a policy to deprioritize data for users with lower tier subscription plans by allocating lesser amount of network resource. For example, in the United States, certain operators intentionally set a maximum download throughput for users in lower tier plans for streaming applications, such as Netflix and YouTube. Irrespective of the cause of bandwidth throttling, the user experience degrades due to higher loading times of webpages, lag and jitter in stream applications, etc.

SUMMARY

This disclosure provides apparatuses and methods for bandwidth throttling detection.

In one embodiment, a user equipment (UE) is provided. The UE includes a transceiver. The transceiver is configured to perform network activity for the UE. The UE further includes a processor operably coupled to the transceiver. The processor is configured to determine whether a change in network activity for the UE exceeds a metric, and upon determination that the metric is exceed, initiate an anomalous event detection process, and determine whether an anomalous event is detected. The processor is further configured to, upon detection of an anomalous event, determine a network load level, and modify, based on the determined network load level, a connection configuration of the UE.

In another embodiment, a method of operating a UE is provided. The method includes determining whether a change in network activity for the UE exceeds a metric, and upon determining that the metric is exceeded, initiating an anomalous event detection process, and determining whether an anomalous event is detected. The method further includes, upon detection of an anomalous event, determining a network load level, and modifying, based on the determined network load level, a connection configuration of the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 19, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
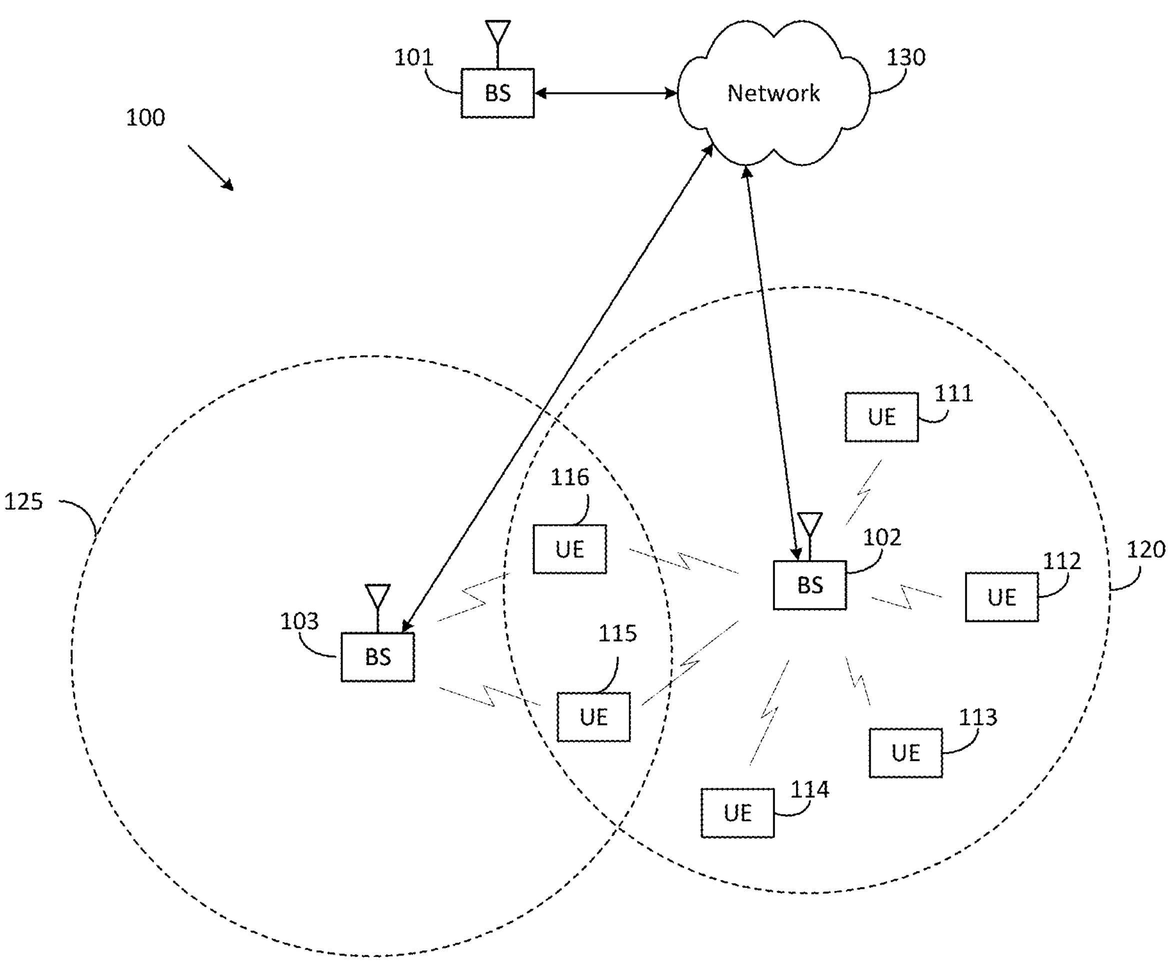
FIG. 1 illustrates an example wireless network according to embodiments of the present disclosure.
Figure 2:
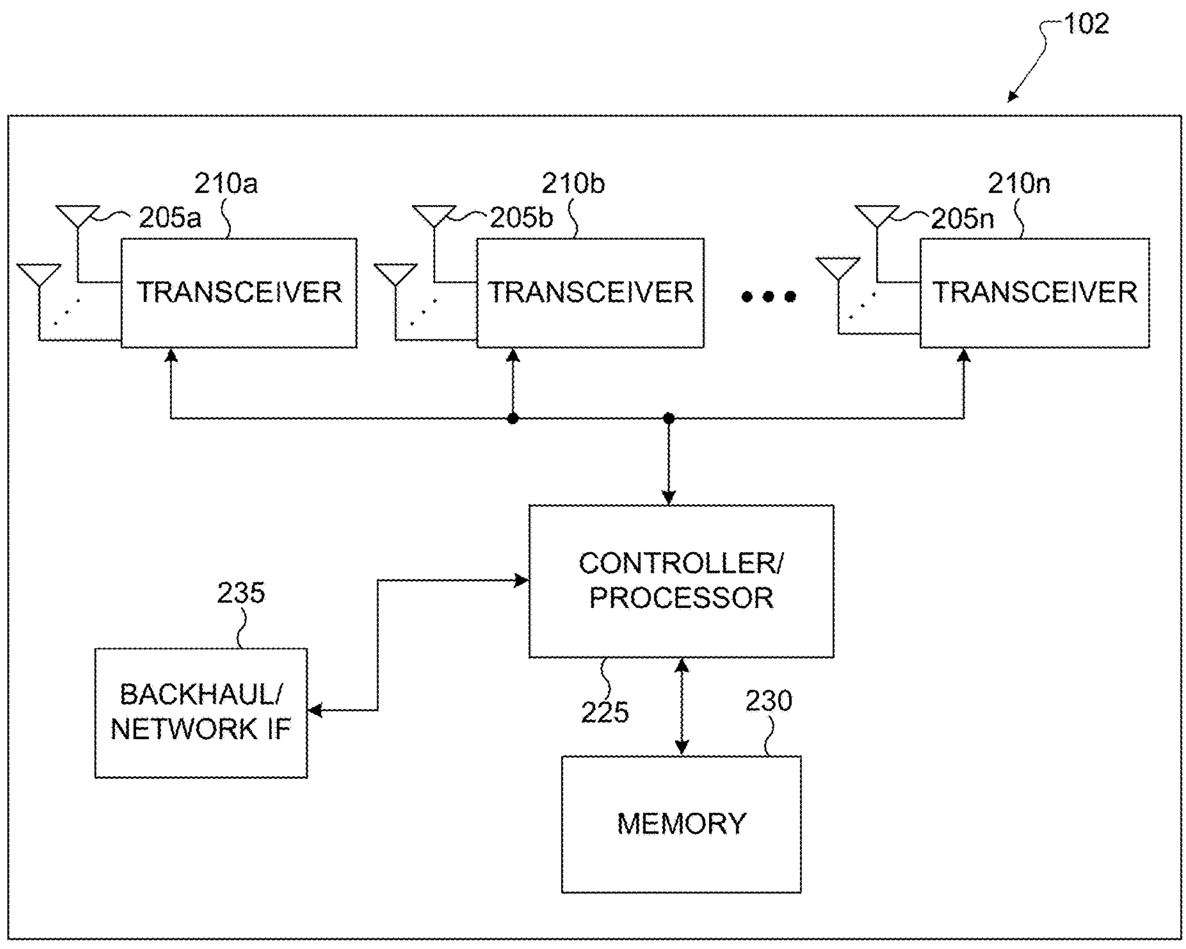
FIG. 2 illustrates an example gNB according to embodiments of the present disclosure.
Figure 3:
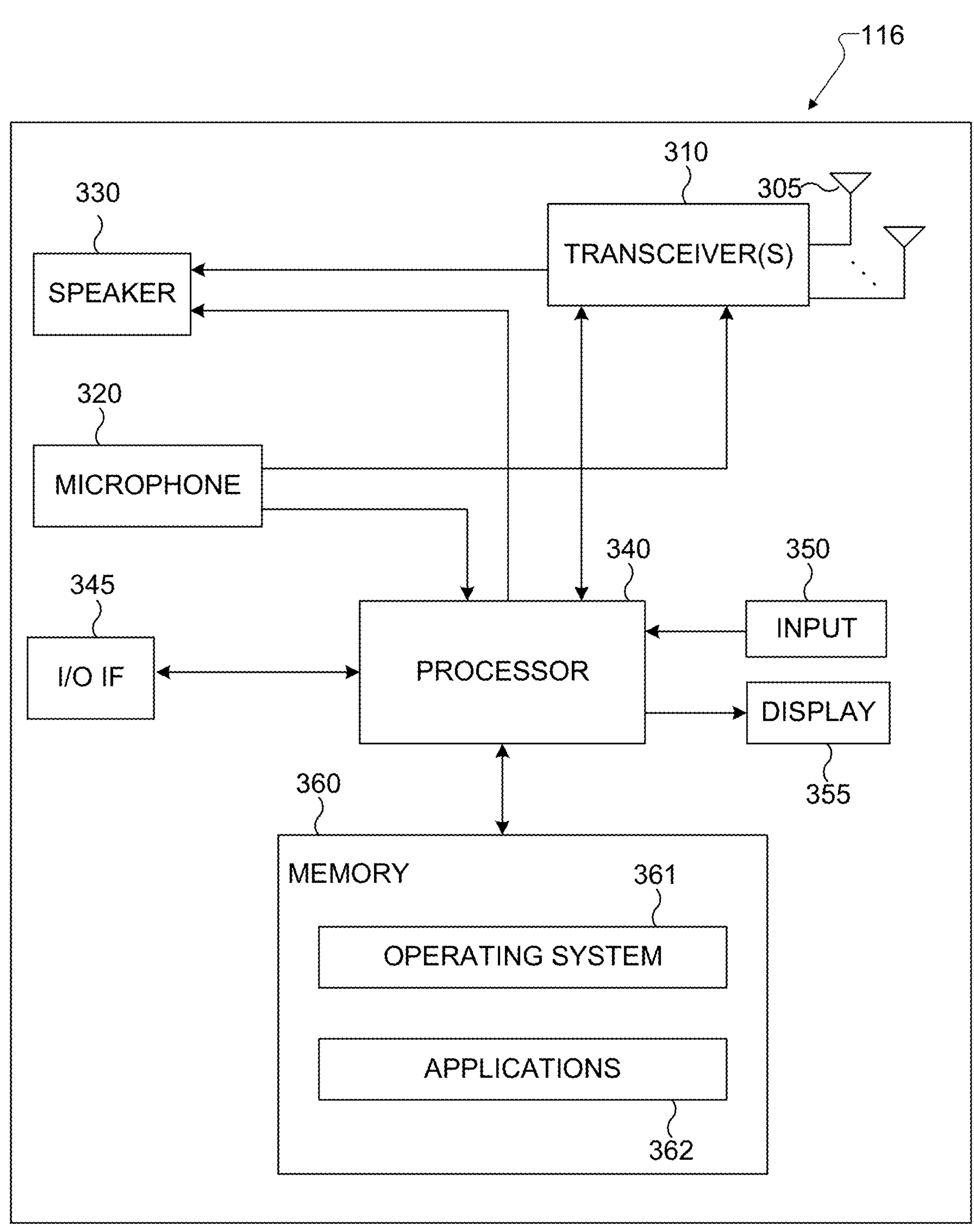
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network 100 according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, longterm evolution (LTE), longterm evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the LUE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for bandwidth throttling detection. In certain embodiments, one or more of the gNBs 101-103 includes circuitry, programing, or a combination thereof, to support bandwidth throttling detection in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS and, for example, processes to support a bandwidth throttling detection as discussed in greater detail below. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, for example, processes for bandwidth throttling detection as discussed in greater detail below. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

As previously described, 5G network operators may implement bandwidth throttling for UEs that persistently request large amounts of data during peak traffic periods. As discussed herein, bandwidth throttling refers to intentional under-provisioning of resources by the network so that the data rate demand for an application may not be satisfied. In 5G NR, network resources are physical resource blocks (PRBs) in the frequency domain, slots in the time domain, and the number of layers for spatial multiplexing in the spatial domain. In cases of bandwidth throttling the network may decide to allocate a significantly lower fraction of the available bandwidth so that the data rate does not exceed a predefined value, which may be less than a data rate that maintains a good Quality of Experience (QoE) for the service type/application. As a consequence, in the case of streaming video applications, the end user may experience frequent stalling. Similarly, in the case of browsing, the end user may experience higher page load times. An example of bandwidth throttling is presented in FIGS. 4A-4B.

Figure 4A:
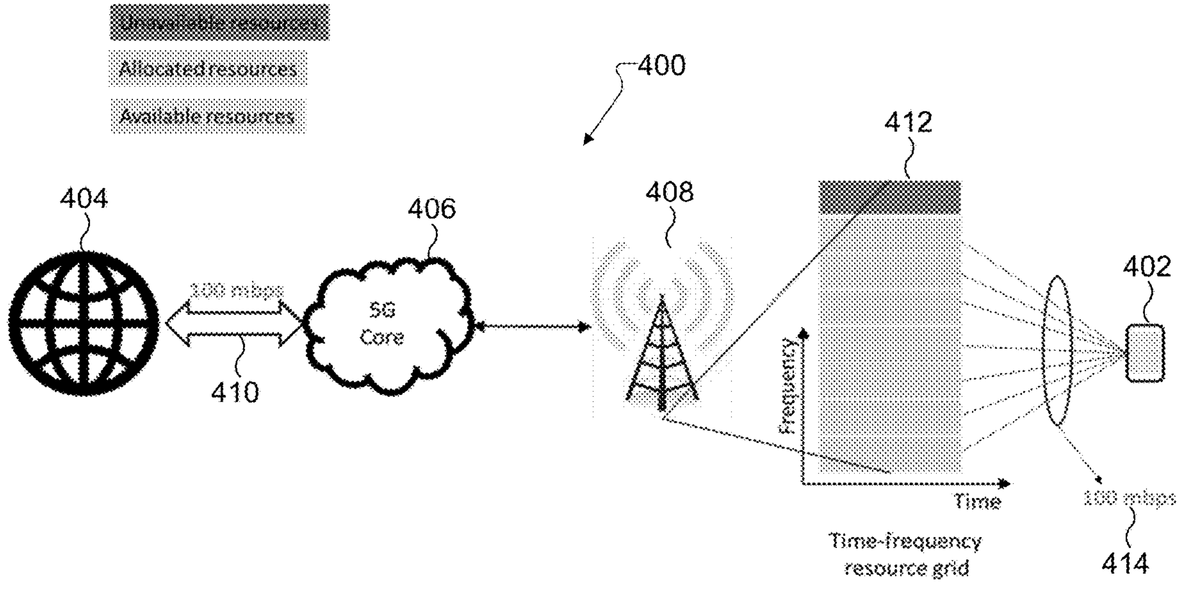
FIGS. 4A and 4B illustrate an example of bandwidth throttling according to embodiments of the present disclosure.
Figure 4B:
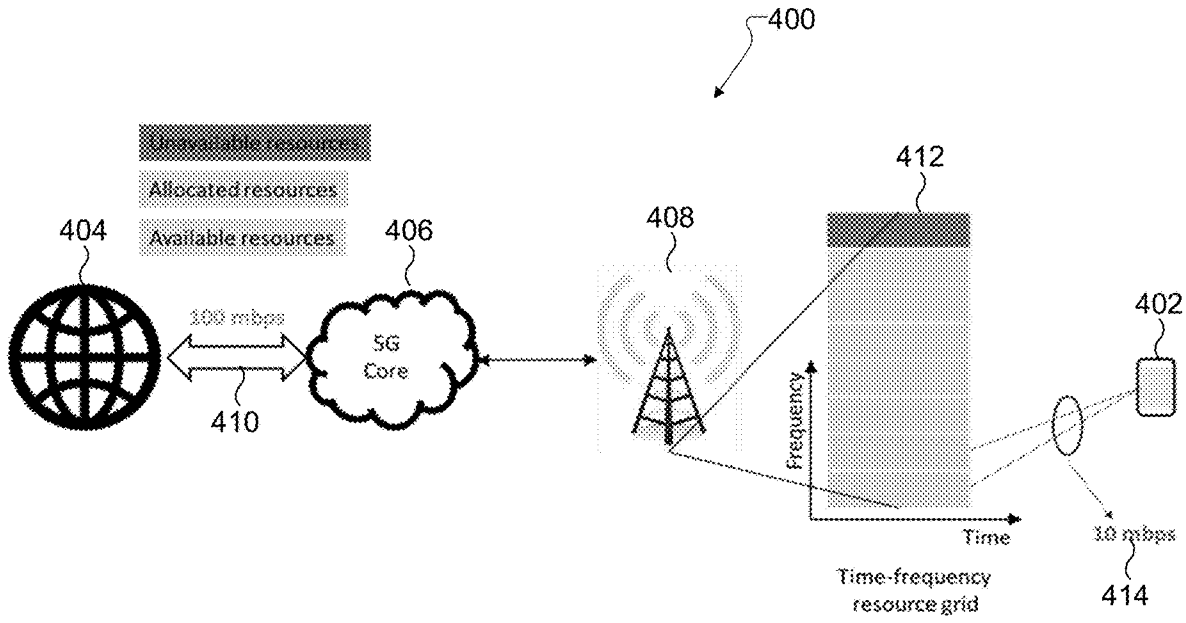

FIGS. 4A-4B illustrate an example 400 of bandwidth throttling according to embodiments of the present disclosure. The embodiment of bandwidth throttling of FIGS. 4A-4B is for illustration only. Different embodiments of bandwidth throttling could be used without departing from the scope of this disclosure.

In the example of FIGS. 4A-4B, a UE 402 is receiving data from a network (e.g., the Internet) via a wireless network that includes a 5G core 406 and a base station 408. UE 402 has a demand 410 of 100 mbps throughput.

In the example of FIG. 4A, the demand 410 of 100 mbps throughput for UE 402 is met (throughput 414) by the wireless network. In this case, base station 408 is allocating all available resources (PRBs 412) to UE 402. In contrast, in the example of FIG. 4B, the network is under provisioning PRBs 412 to introduce intentional bandwidth throttling. As a consequence, the demand 410 of 100 mbps throughput is not met (throughput 414). This may potentially lead to poor quality of experience.

Although FIGS. 4A-4B illustrate an example 400 of bandwidth throttling, various changes may be made to FIG. 4. For example, various changes to the wireless network, the amount of throttling, etc. could be made according to particular needs.

Figure 5:
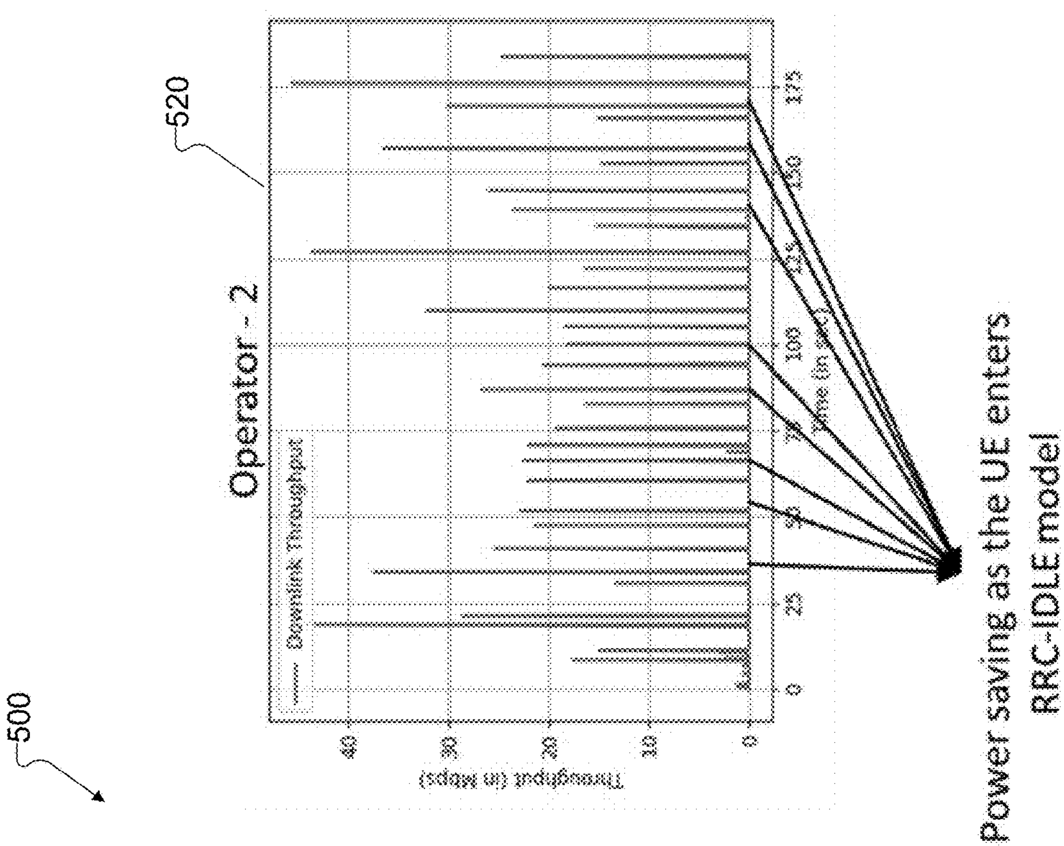
FIG. 5 illustrates experiment values related to bandwidth throttling according to embodiments of the present disclosure.
Figure 5:
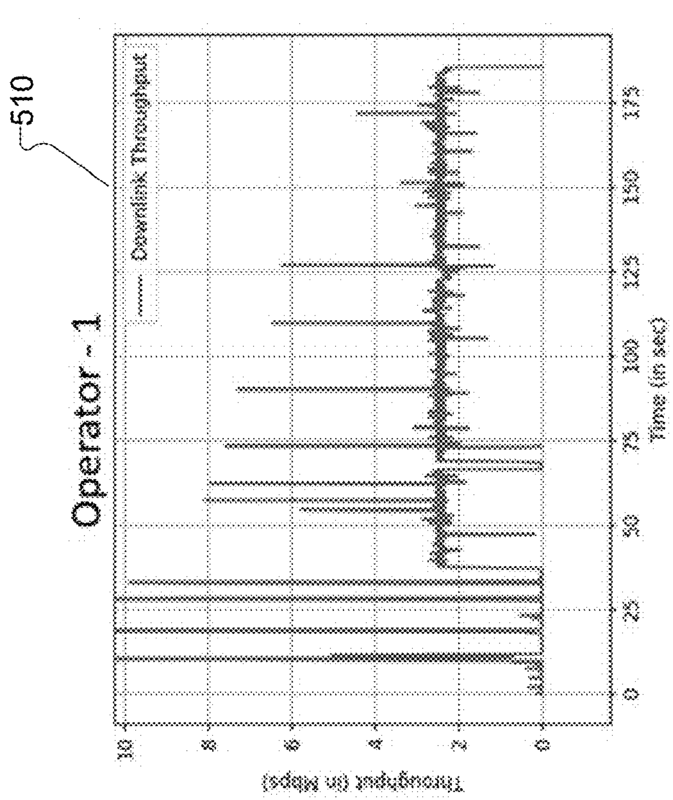

Apart from poor QoE, another consequence of bandwidth throttling may manifest in terms of higher UE power consumption. FIG. 5 illustrates results from an experiment 500 where two UEs were used for streaming the same video application at the same resolution on two different operators' network. The UE on Operator—1, depicted in graph 510 of FIG. 5 experienced throttling while the UE on Operator—2, depicted in graph 520 of FIG. 5, did not experience any throttling. Without throttling, the traffic was bursty as depicted in graph 520 of FIG. 5. Hence, there are periods of no traffic where the UE went into RRC Idle/Inactive mode where the power consumption is significantly less compared to RRC Connected mode. Further, in the case of RRC connected mode, the UE has more opportunity to enter into the sleep stage of a DRX cycle. Due to these power saving opportunities, at the end of the experiment, it was observed that the UE on Operator—2 had less battery power consumption compared to the UE on Operator—1.

Experimental data collected from live networks suggests that the aforementioned bandwidth throttling may lead to the following undesirable consequences:

- Poor Quality of Experience (QoE): Due to limited available bandwidth, the UE data buffer may get depleted more often and frequently. For streaming applications, this results in video/audio stalling, which has the most negative impact on end-user engagement. Less throughput due to throttling also leads to reduced video quality and audio jitter that may adversely impact the user experience. Further, for applications such as web browsing, the page loading time may increase which can degrade the user experience.
- Higher UE battery usage: As discussed above, bandwidth throttling may lead to change in traffic patterns for streaming applications, e.g., from a bursty traffic pattern to a constant bit rate traffic pattern. As a consequence, the UE needs to constantly download data, send periodic and frequent data such as acknowledgements and requests for fetching new segments of an audio/video. As the UE needs to stay on for longer durations, this may lead to higher power consumption stemming from persistent monitoring and decoding of the control channel, less discontinuous reception (DRX) sleep opportunity, power consumption for UL transmissions, etc. Overall, a higher battery usage for the UE results.

In the event of bandwidth throttling, the UE has a limited set of responses to improve the situation. If the bandwidth throttling is due to under provisioning of resources, the UE may use a virtual private network (VPN) to improve the throughput. If a VPN is unavailable, then the UE may take certain actions to mitigate degradation in quality of service. For example, in the case of video streaming applications, the UE may reduce the video resolution so that the video can run smoothly with less throughput demand. In another scenario, the UE may opt to switch to a Wi-Fi network from cellular if available. The present disclosure provides methods to enable detection of bandwidth throttling so that the UE may take mitigating actions.

Figure 6:
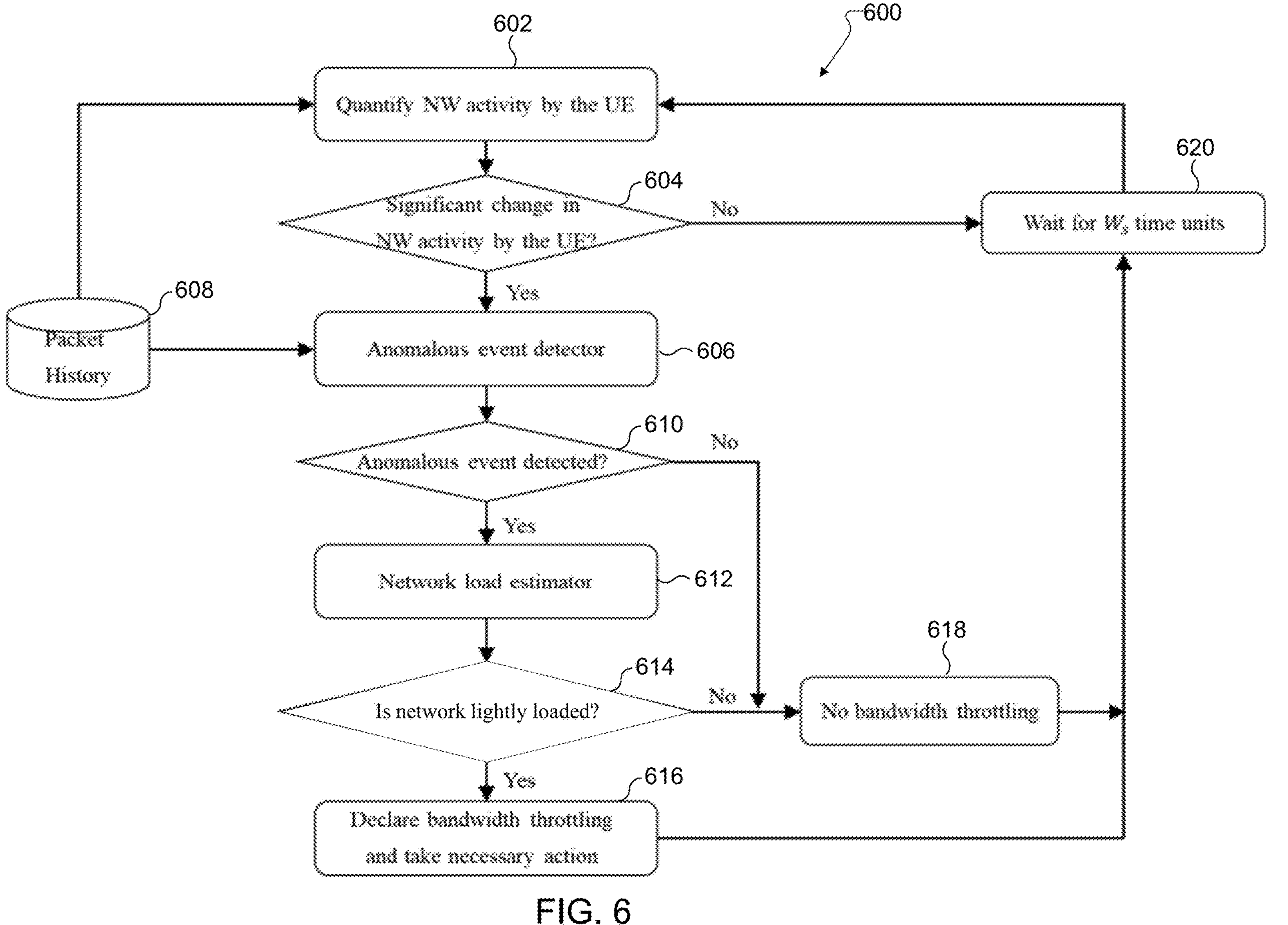
FIG. 6 illustrates an example method for detecting bandwidth throttling according to embodiments of the present disclosure.

FIG. 6 illustrates an example method for detecting bandwidth throttling 600 according to embodiments of the present disclosure. An embodiment of the method illustrated in FIG. 6 is for illustration only. One or more of the components illustrated in FIG. 6 may be implemented in specialized circuitry configured to perform the noted functions or one or more of the components may be implemented by one or more processors executing instructions to perform the noted functions. Other embodiments of detecting bandwidth throttling could be used without departing from the scope of this disclosure.

In the example of FIG. 6, the method begins at block 602. At block 602, a UE such as UE 116 of FIG. 1 monitors its network activity for significant changes. At block 604, the method progresses based on significant changes in the network activity of the UE. This may result in improved power efficiency as most of the decision blocks need not run frequently and periodically. A significant change in UE's network activity may be characterized by the change in packet statistics over past observation windows. For example, if the change in average throughput in $(-W_s, 0]$ is significantly different from the average throughput in $(-2W_s, -W_s]$, the UE may conclude that there is a significant change in network activity and trigger an anomalous event detector (AED) at block 606. Otherwise, the method proceeds to block 620. The typical value of W could be in the order of seconds, e.g., 5 seconds for a streaming application. In another example the UE may conclude there is a significant change in the UE's NW activity when the transport protocol used in $(-W_s, 0]$ is different from the transport protocol used in $(-2W_s, -W_s]$. For example, a change in the transport layer protocol from TCP to UDP may indicate that a new buffered streaming application may have started. The change in the transport layer protocol can be obtained from netstat, which is a tool that provides information regarding the UE's network connections.

Once the AED is triggered (block 606), the UE detects any anomalous event (block 610) using the UE's packet history (block 608), where a packet could be used from any layer in the protocol stack, e.g., a Transport Block (TB) which is from the PHY-layer Service Data Unit (SDU), a Medium Access Control (MAC) SDU, an IP packet, etc. Anomalous event detection may use the statistics of different metrics associated with the packet transmission, e.g., size, inter-arrival time among packets, number of packets over a specific time window, etc. The anomalous event could be abnormally low throughput, frequent video stalling, low-resolution video call quality, high latency, etc. For example, if for a video streaming application, the throughput over the observation windows (e.g., 5 seconds) is less than a certain threshold (e.g., 100 kbps), then the UE may classify it as abnormally low throughput. Frequent video stalling can be inferred if the streaming service buffer approaches zero in many instances.

Once an anomalous event is detected with high confidence, at block 612 the network load is estimated. The load estimation can be performed using active or passive methods. For example, active methods may involve bandwidth probing by downloading a file from an FTP server similar as described regarding FIG. 15 herein. In contrast, the passive method may use load estimation based on observation of the radio parameters such as Reference Signal Received Power (RSRP), Reference Signal Strength Indicator (RSSI), Reference Signal Received Quality (RSRQ), etc. similar as described regarding FIGS. 13 and 14 herein. Using one or more of these pieces of information, at block 614 the UE determine if the network is lightly loaded. If the network is lightly loaded, the method proceeds to block 616, and the UE may infer that the network is deliberately under-provisioning the network resources and declare throttling has been detected. Once throttling is detected, the UE may take appropriate action to avoid such conditions, e.g., the UE may prompt the user to lower the resolution of the streaming video so that stalling event can be avoided. Another solution is the use of a Virtual Private Network (VPN) server so that if the operator throttles bandwidth for a particular type of streaming service, then UE may select an appropriate VPN server to obfuscate the service type from the network. In contrast, if the network is overloaded, the method proceeds to block 618, and then the UE may infer that there is no bandwidth throttling by the network, and the UE's action may involve waiting for some time for the high load condition to ameliorate. Alternatively, the UE may switch to a different Radio Access Technology (RAT), e.g., switch from 5G to 4G or Wi-Fi networks.

Although FIG. 6 illustrates one example of a method for detecting bandwidth throttling 600, various changes may be made to FIG. 6. For example, while shown as a series of steps, various steps in FIG. 6 could overlap, occur in parallel, occur in a different order, occur any number of times, be omitted, or replaced by other steps.

Figure 7:
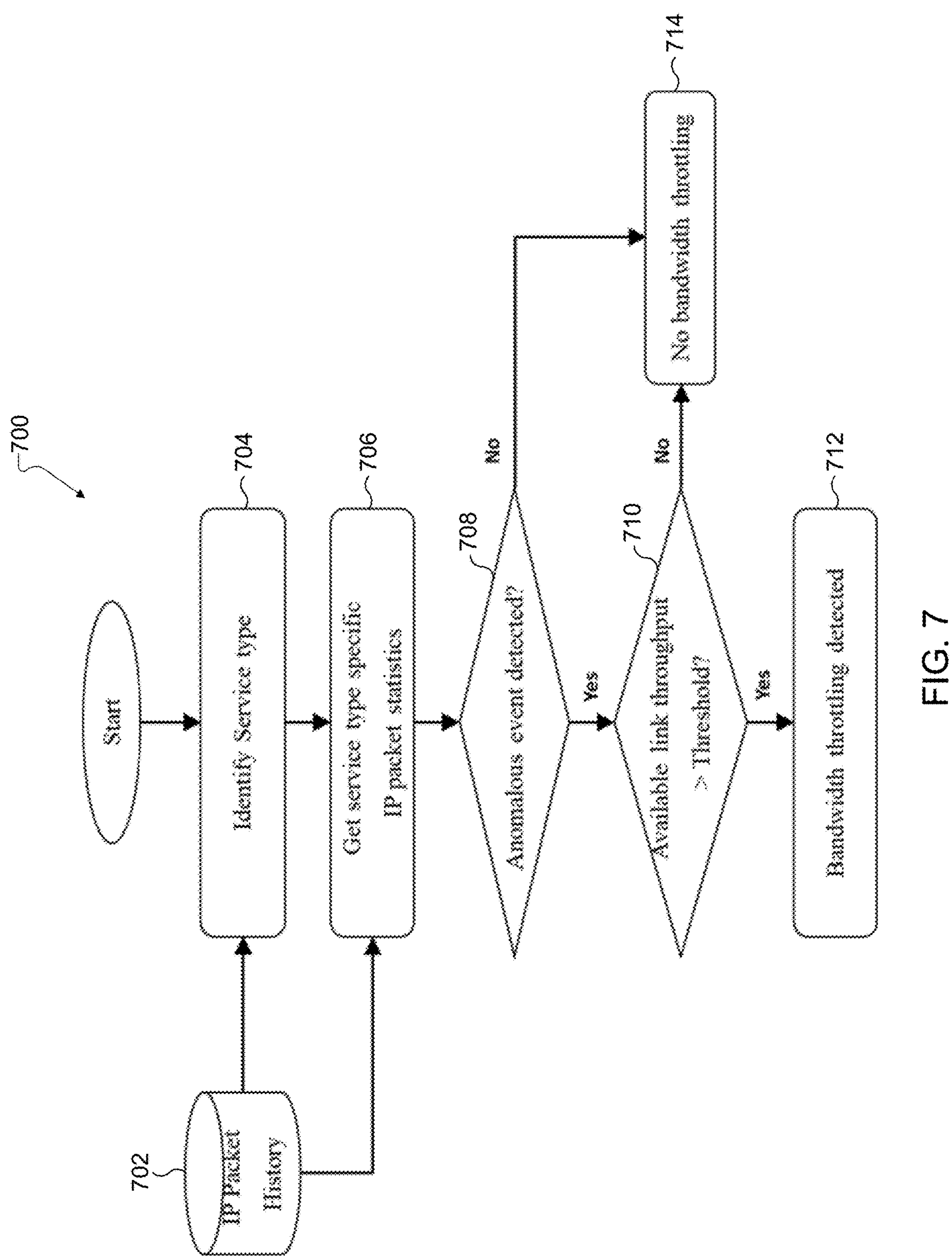
FIG. 7 illustrates an example method for detecting bandwidth throttling using information from IP, transport, or application layers according to embodiments of the present disclosure.

FIG. 7 illustrates an example method for detecting bandwidth throttling using information from IP, transport, or application layers 700 according to embodiments of the present disclosure. An embodiment of the method illustrated in FIG. 7 is for illustration only. One or more of the components illustrated in FIG. 7 may be implemented in specialized circuitry configured to perform the noted functions or one or more of the components may be implemented by one or more processors executing instructions to perform the noted functions. Other embodiments of detecting bandwidth throttling using information from IP, transport, or application layers could be used without departing from the scope of this disclosure.

In the example method of FIG. 7, a UE such as UE 116 of FIG. 1 determines whether bandwidth throttling is happening in the network using information from higher layers of the OSI model, e.g., IP, transport, and application layer information. The blocks in FIG. 7 represent operations that follow after an AED is triggered as described regarding FIG. 6. The method beings at block 704. At block 704, using the IP packet history 702, the UD identifies the application running on the UE. The IP packet history may include packet size, packet inter-arrival time, packet type (e.g., ACK or application data), direction of the packet (i.e., uplink or downlink), etc. Next at blocks 706 and 708, the anomalous event for the specific service type may be detected through network, transport, or application layer information. For example, for streaming applications, the UE may constantly monitor the buffer status of the application. If the buffer is below a stall threshold or zero, the UE may determine that stalling, which is an anomalous event, has happened. If the application is not configured to share the buffer status for some reason (e.g., security or privacy concerns), then the UE may infer the stalling event after detecting key signatures in IP packet statistics and the transport layer protocol. After successfully detecting the anomalous event, at block 710 the UE can estimate the available transport layer link throughput either by active probing or passive measurements. If the available link throughput is above a threshold (after taking into consideration the throughput of the running application), the UE may infer that the network is performing intentional bandwidth throttling at block 712. In contrast, if no anomalous event is detected or available link throughput is less due to a high load scenario, at block 714 the UE may conclude that there is no intentional bandwidth throttling by the network.

Although FIG. 7 illustrates one example of a method for detecting bandwidth throttling using information from IP, transport, or application layers 700, various changes may be made to FIG. 7. For example, while shown as a series of steps, various steps in FIG. 7 could overlap, occur in parallel, occur in a different order, occur any number of times, be omitted, or replaced by other steps.

Figure 8:
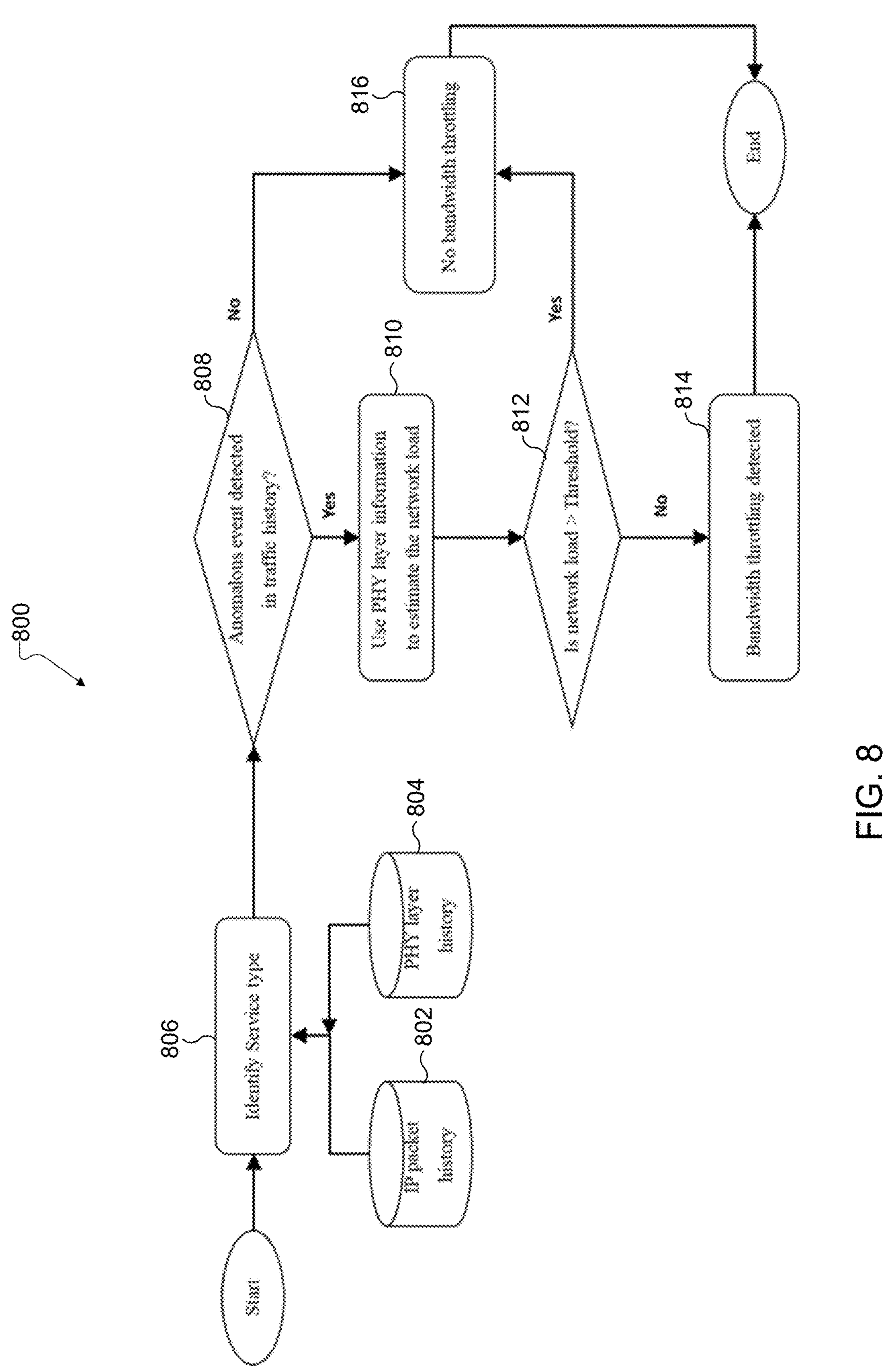
FIG. 8 illustrates an example method for leveraging information from the PHY layer for detecting bandwidth throttling according to embodiments of the present disclosure.

FIG. 8 illustrates an example method for leveraging information from the PHY layer for detecting bandwidth throttling 800 according to embodiments of the present disclosure. An embodiment of the method illustrated in FIG. 8 is for illustration only. One or more of the components illustrated in FIG. 8 may be implemented in specialized circuitry configured to perform the noted functions or one or more of the components may be implemented by one or more processors executing instructions to perform the noted functions. Other embodiments of leveraging information from the PHY layer for detecting bandwidth throttling could be used without departing from the scope of this disclosure.

In the example method of FIG. 8, a UE such as UE 116 of FIG. 1 leverages information from the PHY layer for bandwidth throttling detection. In this case, to identify the service type, the UE uses a the PHY layer information such as TB size, Modulation and Coding Scheme (MCS), number of allocated PRBs, Channel Quality Indicator (CQI), and Rank Indicator (RI), etc. along with the IP packet statistics similar as described regarding FIG. 7. The method beings at block 806. At block 806 the UE obtains the aforementioned information (TP packet history 802 and PHY layer history 804) for a specified period that is used to identify the existing application running on the UE. At block 808, once the application is identified, the UE takes a further look at both the PHY metric history and IP packet history to determine if anomalous traffic characteristics related to bandwidth throttling exist. At this point, it is not clear if the network is intentionally allocating less bandwidth or if it has high resource utilization due to high load conditions. Hence, at block 810 the UE may perform certain additional measurements to estimate the load (in terms of the number of PRBs being utilized) of the network. These load estimation techniques can be active or passive. At block 812, if the load is above a certain threshold, then the UE may infer that the network resources are utilized by other users. Hence, there is no intentional throttling by the network (block 816). In such a scenario, the UE may take necessary action to switch to a band with a lower load. In contrast, if the load is less than the threshold, i.e., the network is lightly loaded, then at block 814 the UE may infer that the network is performing intentional bandwidth throttling. In this case, the UE may perform appropriate action to minimize the impact on the user QoE.

Although FIG. 8 illustrates one example of a method for leveraging information from the PHY layer for detecting bandwidth throttling 800, various changes may be made to FIG. 8. For example, while shown as a series of steps, various steps in FIG. 8 could overlap, occur in parallel, occur in a different order, occur any number of times, be omitted, or replaced by other steps.

In the examples of FIGS. 7 and 8, identification of the service type at blocks 704 and 806 may be performed by a service type identification module also referred to herein as a 5G Service-type Detector (5GSD). The service type identification module may consider both IP packet history and PHY layer metrics to determine the application(s) that are running on the UE. Different applications can be broadly categorized into real time and non-real time traffic. Example non-real time traffic includes applications such as streaming (e.g., YouTube, Netflix, Prime video, etc.), and browsing (e.g., browsing in an app or on web browser). Example real time traffic includes audio calls (e.g., WhatsApp, Messenger, Viber, etc.), videos call (e.g., WhatsApp, Messenger, MS Teams, etc.), online low-bit rate gaming (e.g., Among Us), and online high-bit rate gaming (e.g., PUBG, Call of duty, etc.).

For the example presented in FIG. 7, the 5GSD module takes IP packet history over a specified time window as input and predicts the applications that may be running at the UE. The module may consider features such as packet inter-arrival time, packet size, flow type, number of active flows, traffic class of each flow, etc., to determine the application. For example, if the transport layer protocol is UDP with a constant bit rate, it may classify the traffic as real-time audio or a video call. On the other hand, if the transport layer protocol is TCP with bursty traffic, then it may be associated with streaming applications.

Further, for the example presented in FIG. 8, the 5GSD module may also consider statistics related to different PHY metrics such as TB size, MCS, number of allocated PRBs, CQI, RI, etc., over a past observation window along with the IP packet history. For example, if the allocated MCS is persistently lower than what is expected from the CQI report, then it may be an indication that the BS is using conservative MCS for higher reliability. Hence, the service type may be classified as a low throughput and low latency real-time service such as audio/video call. Moreover, the 3GPP specified 5QI values associated with the packet data unit (PDU) session may also indicate the service type. The additional information along with inference from IP packet history may result in more accurate detection of the service type.

As previously discussed herein, the methods described in FIGS. 6-8 include the step of detecting anomalous events at blocks 610, 708 and 808. Anomalous events for identification may be application specific and caused due to a lower amount of bandwidth allocated by the network to the UE. For example, observation from real world data suggests that for a UE with hotspot enabled, the network performs bandwidth throttling. Similarly, for streaming applications the throughput provisioned by the network is capped at certain data rate. This may lead to frequent stalling if a video with higher resolution and frame rate is played. The present disclosure provides several example embodiments of an AED to detect these events.

For streaming type applications, stalling can be one potential anomaly due to bandwidth throttling as the amount of data in the application buffer reaches zero more frequently. In one embodiment, an AED for streaming applications may use information from any combination of the following layers of the protocol stack to determine the stalling event.

1. Querying the application process associated with the streaming service:
2. Using the IP and transport layer information
3. Using the PHY layer information The design principle behind querying the application process associated with the streaming service as provided herein is that the AED may directly query the application process regarding a particular metric to infer if anomalous event associated with the service type may occur in the near future or may already have occurred.

Figure 9:
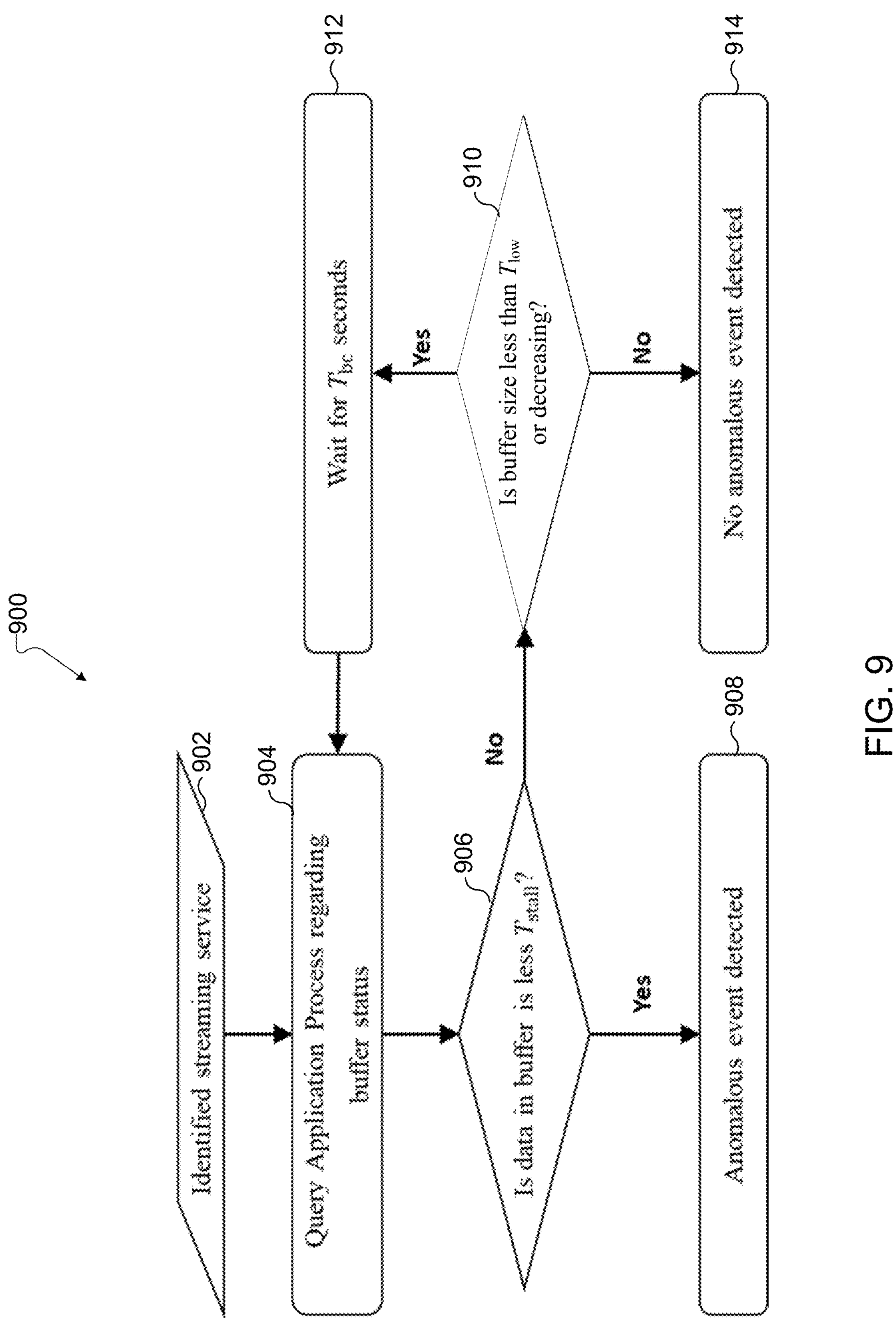
FIG. 9 illustrates an example method for anomalous event detection for streaming by querying an application process according to embodiments of the present disclosure.

FIG. 9 illustrates an example method for anomalous event detection for streaming by querying an application process 900 according to embodiments of the present disclosure. An embodiment of the method illustrated in FIG. 9 is for illustration only. One or more of the components illustrated in FIG. 9 may be implemented in specialized circuitry configured to perform the noted functions or one or more of the components may be implemented by one or more processors executing instructions to perform the noted functions. Other embodiments of anomalous event detection for streaming by querying an application process could be used without departing from the scope of this disclosure.

In the example of FIG. 9, the method begins at block 904 where the application is the identified streaming service 902. At block 904, the AED directly queries the streaming application 902 regarding its buffer status to infer the anomalous event related to stalling. At block 906, if the content duration in the application buffer is less than a predefined value $T_{stall}$, then at block 908 the AED may declare that stalling is detected. If the data in the buffer is more than $T_{stall}$, then at block 910 AED queries the application process periodically as long as either the content duration in the buffer is below a threshold $T_{low}(>T_{stall})$ or $T_{low}$ is decreasing over the last few consecutive queries (block 912). With this logic, the UE checks for the anomalous event only when the buffer health is not so good either in terms of not having sufficient amount of stream time or a decreasing buffer. The periodicity $T_{bc}$ of this operation should be less than the periodicity $W_s$ of running the bandwidth throttling detector as described regarding FIG. 6. Otherwise, if the buffer is above the threshold $T_{low}(>T_{stall})$ or $T_{low}$ is decreasing over the last few consecutive queries, no anomalous event is detected (block 914).

Although FIG. 9 illustrates one example of a method for anomalous event detection for streaming by querying an application process 900, various changes may be made to FIG. 9. For example, while shown as a series of steps, various steps in FIG. 9 could overlap, occur in parallel, occur in a different order, occur any number of times, be omitted, or replaced by other steps.

Figure 10:
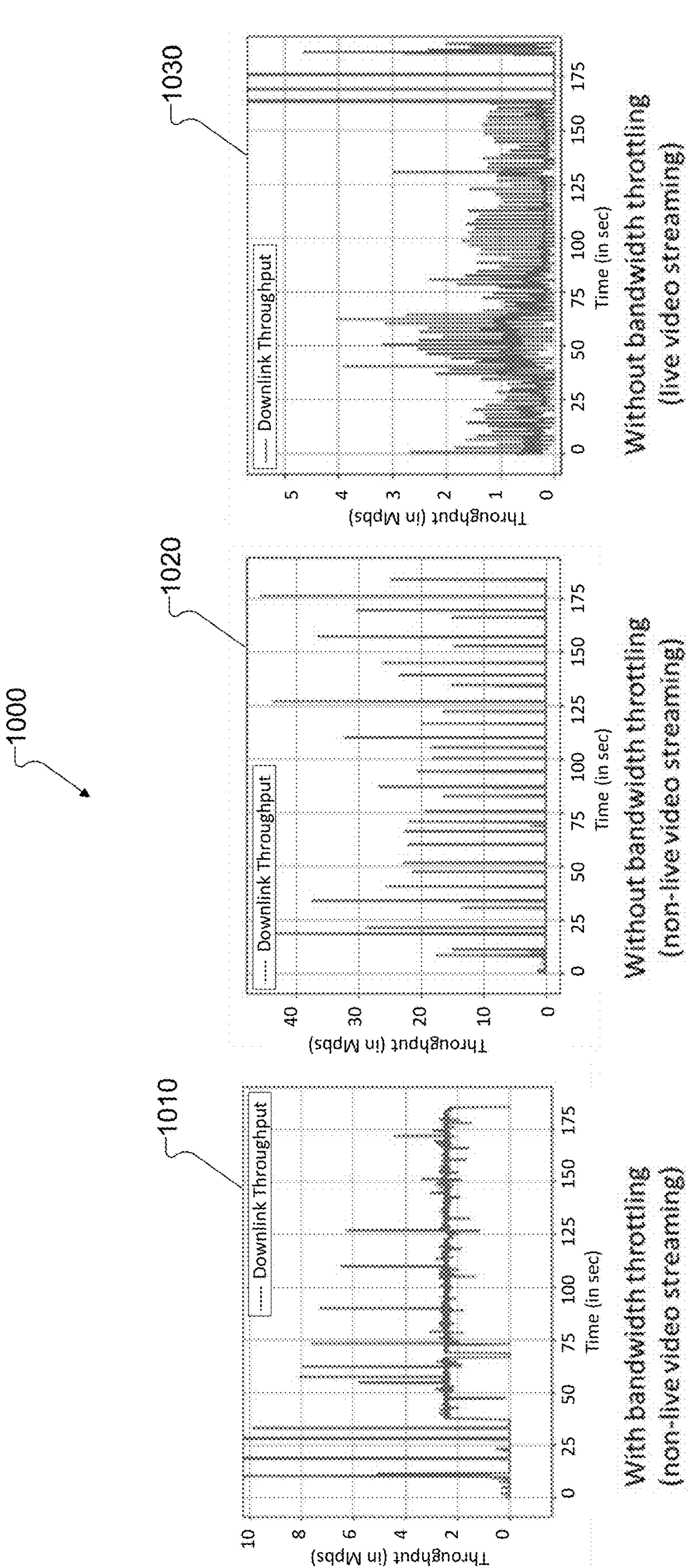
FIG. 10 illustrates examples of downlink throughput according to embodiments of the present disclosure.

The present disclosure provides an embodiment for detecting an anomalous event for streaming application using transport layer throughput. The design principle behind this embodiment is that in the presence of active bandwidth throttling, the demanded throughput to support an acceptable QoE is higher than the available throughput provisioned by the network. Hence, in the sender's buffer (e.g., remote streaming server's buffer) there will be data to transmit and the receiver is expected to receive data in more frequent scheduling intervals in the time domain. As a consequence, relatively more persistent throughput (i.e., throughput with low variance) may be observed due to continuous arrival of packets. The persistent throughput may be expected for constant bit rate traffic such as audio and video calls. However, for streaming applications, this may indicate an anomalous event occurring due to bandwidth throttling. FIG. 10 illustrates three examples of downlink throughput for YouTube with and without bandwidth throttling 1000. In graph 1010, the downlink throughput is presented for non-live video streaming with bandwidth throttling. In graph 1020, the downlink throughput is presented for non-live video streaming without bandwidth throttling. In graph 1030, the downlink throughput is presented for live video streaming without bandwidth throttling. In case of bandwidth throttling, there are observed several stalling events. However, without bandwidth throttling, the video playback was normal in both the cases.

As can be seen in FIG. 10, it is clear that with bandwidth throttling, the average throughput (after 38 seconds when the application starts running) stays around 2.5 Mbps with relatively small variation in the instantaneous throughput. In contrast, without throttling cases, relatively more bursty traffic arrival can be observed. Therefore, one indirect approach of detecting the stalling event due to bandwidth throttling is to observe the variation in the throughput over a certain past window. In one embodiment, the coefficient of variation (CoV) of the throughput to quantify the throughput variation is used. With respect to the present disclosure, the CoV may be defined as $$C_v(R) = \frac{\sigma(R)}{\mu(R)},$$

where R is a vector of observed throughput over a past window of observation, e.g., 10 seconds, σ(R) is the standard deviation of R, and μ(R) is the mean of R.

Figure 11:
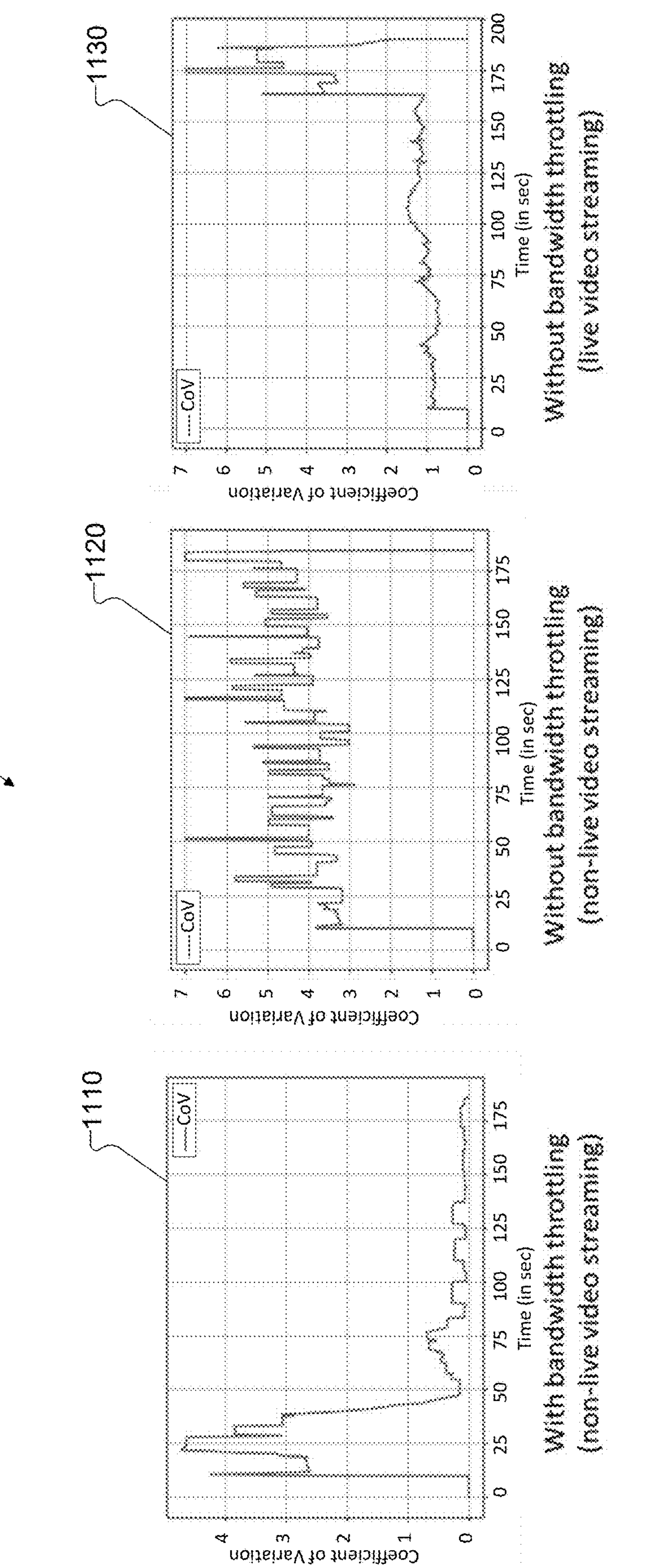
FIG. 11 illustrates examples of coefficient of variation of downlink throughput according to embodiments of the present disclosure.

FIG. 11 illustrates the CoV of the downlink throughput over the past 10 seconds 1100 for all three of the scenarios of FIG. 10. In the example of FIG. 11, graph 1110 illustrates the CoV of graph 1010, graph 1120 illustrates the CoV of graph 1020, and graph 1130 illustrates the CoV of graph 1030. As expected, the CoV is low (mostly less than 0.5) for the downlink throughput when bandwidth throttling is employed by the network (graph 1110). In contrast, without bandwidth throttling it can be observed that the CoV is greater than 3 in graph 1120 and mostly greater than 0.8 in graph 1130. Hence, CoV may be used to identify scenarios with low throughput variation that may be induced due to bandwidth throttling and resulting in stalling of streaming applications.

Figure 12:
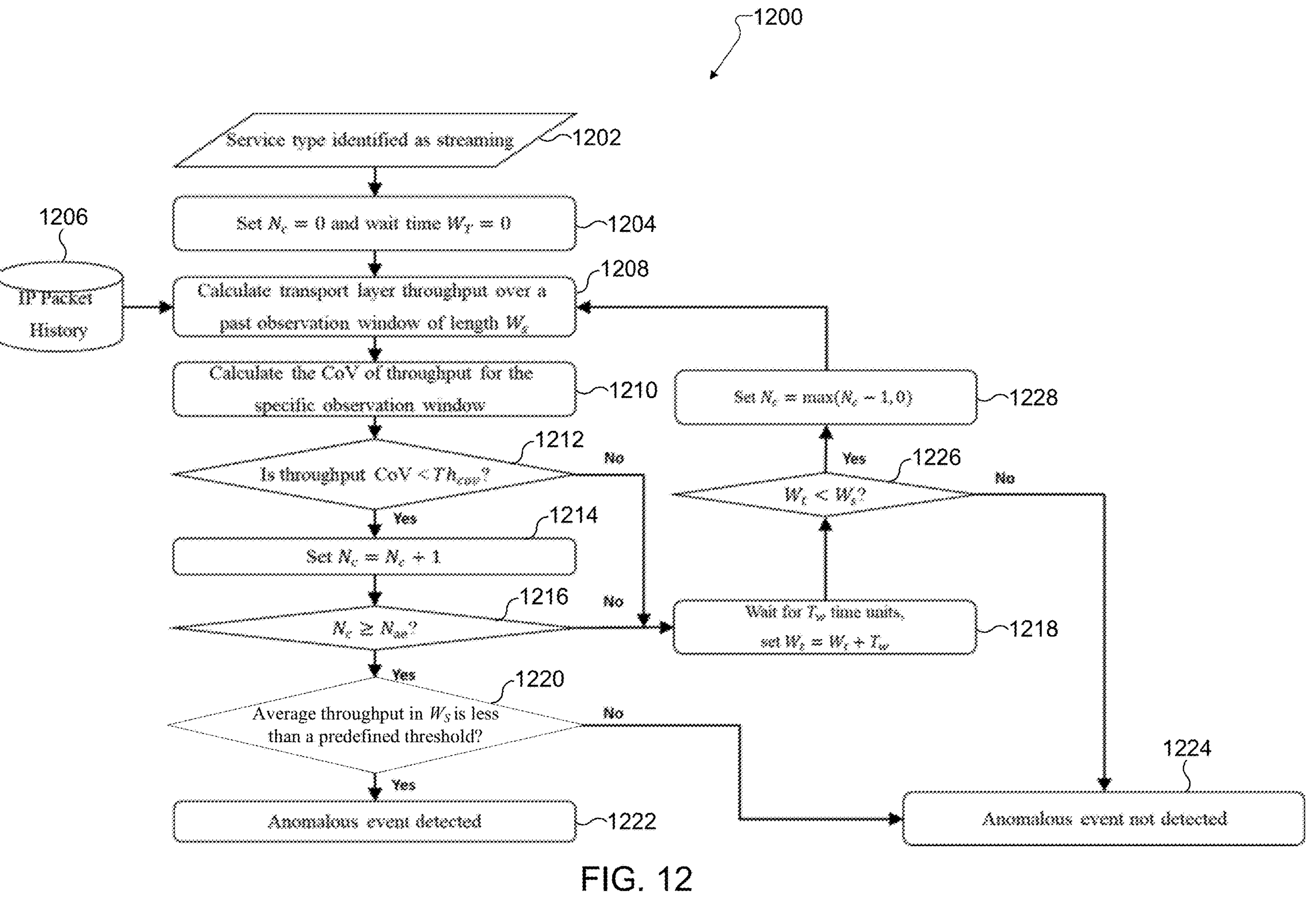
FIG. 12 illustrates an example method of detecting bandwidth throttling using the CoV of past throughput according to embodiments of the present disclosure.

FIG. 12 illustrates an example method of detecting bandwidth throttling using the CoV of past throughput 1200 according to embodiments of the present disclosure. An embodiment of the method illustrated in FIG. 12 is for illustration only. One or more of the components illustrated in FIG. 12 may be implemented in specialized circuitry configured to perform the noted functions or one or more of the components may be implemented by one or more processors executing instructions to perform the noted functions. Other embodiments of detecting bandwidth throttling using the CoV of past throughput could be used without departing from the scope of this disclosure.

In the example of FIG. 12, the method begins at block 1204 where the service type has previously been identified as streaming (block 1202). At blocks 1204 and 1208, the UE gets the transport layer throughput from the IP packet history 1206 over a specified past observation window $W_s$ time units, e.g., 10 seconds. Next, at block 1210 the UE calculates the CoV of the throughput and at block 1212 compares it to threshold $Th_{cov}$ which may be obtained using a data driven approach. If the CoV of throughput during $W_s$ is less than a CoV threshold $Th_{cov}$, then at block 1214 the UE infers that bandwidth throttling may be occurring and increments the counter $N_c$. For more robust inference, the UE may compare the CoV of throughput every $W_t$ time units, e.g., 1 second (blocks 1218, 1226, and 1228). At block 1216, once the counter $N_e$ reaches the predefined threshold $N_{ae}$, where $N_{ae}$ should satisfy $N_{ae}W_T \leq W_s$, at block 1420, the UE makes an additional check regarding the average throughput over the past observation window of length $W_s$. If the average throughput is above a certain threshold, then it may be sufficient to say that although the UE is experiencing persistent throughput, the user QoE may not get affected as the data rate is high. Hence, the UE may declare the event to be not anomalous at block 1224. For streaming applications, the UE may set this threshold to be 8 mbps which can stream 1080p video at 60 fps. If the average throughput is below the threshold, the UE determines that that is an anomalous event at block 1222.

Although FIG. 12 illustrates one example of a method of detecting bandwidth throttling using the CoV of past throughput 1200, various changes may be made to FIG. 12. For example, while shown as a series of steps, various steps in FIG. 12 could overlap, occur in parallel, occur in a different order, occur any number of times, be omitted, or replaced by other steps.

In one embodiment, the UE detects an anomalous event in a streaming application using the statistics of "HTTP Get Requests". In this approach, the UE uses network layer and transport layer information to filter a specific type of packets and analyzes related statistics to determine the anomalous event.

The contents of a streaming audio/video file are stored in the content servers in form of audio/video chunks. Each chunk carries a certain duration of the streaming content. When the streaming application runs on a client device (e.g., UE), it sends an HTTP GET Request to the server to fetch a particular chunk. Upon receiving the HTTP GET Request, the server transmits that particular chunk to the client device. Based on the knowledge of how many chunks are downloaded during a particular observation window, the UE may be able to infer the buffer status as well as a stalling event. A key assumption is that at any given time only one chunk is downloaded by the client that appears to be true for popular content providers such as YouTube and Netflix.

Consider that during an observation window $W_0$, n chunks have been downloaded. Let $C_i$ be the duration of the content present in the i-th chunk. $C_i$ may be modeled as a random variable whose statistics can be obtained from measurement data. Note that the chunk statistics take into account the size of the chunks to estimate the content resolution and the number of frames per second in a particular chunk. Conditioned on this information, the statistics of the random variable $C_i$ can be appropriately selected. As long as $$Pr\left[\sum_{i=1}^{n} C_i > W_o\right]$$

is high, the application is likely to have a large buffer. In contrast, if $$Pr\left[\sum_{i=1}^{n} C_i > W_o\right] \to 0,$$

then the UE may infer that the application buffer is depleted and a potential stalling event may occur. This indicates an anomalous event.

Figure 13:
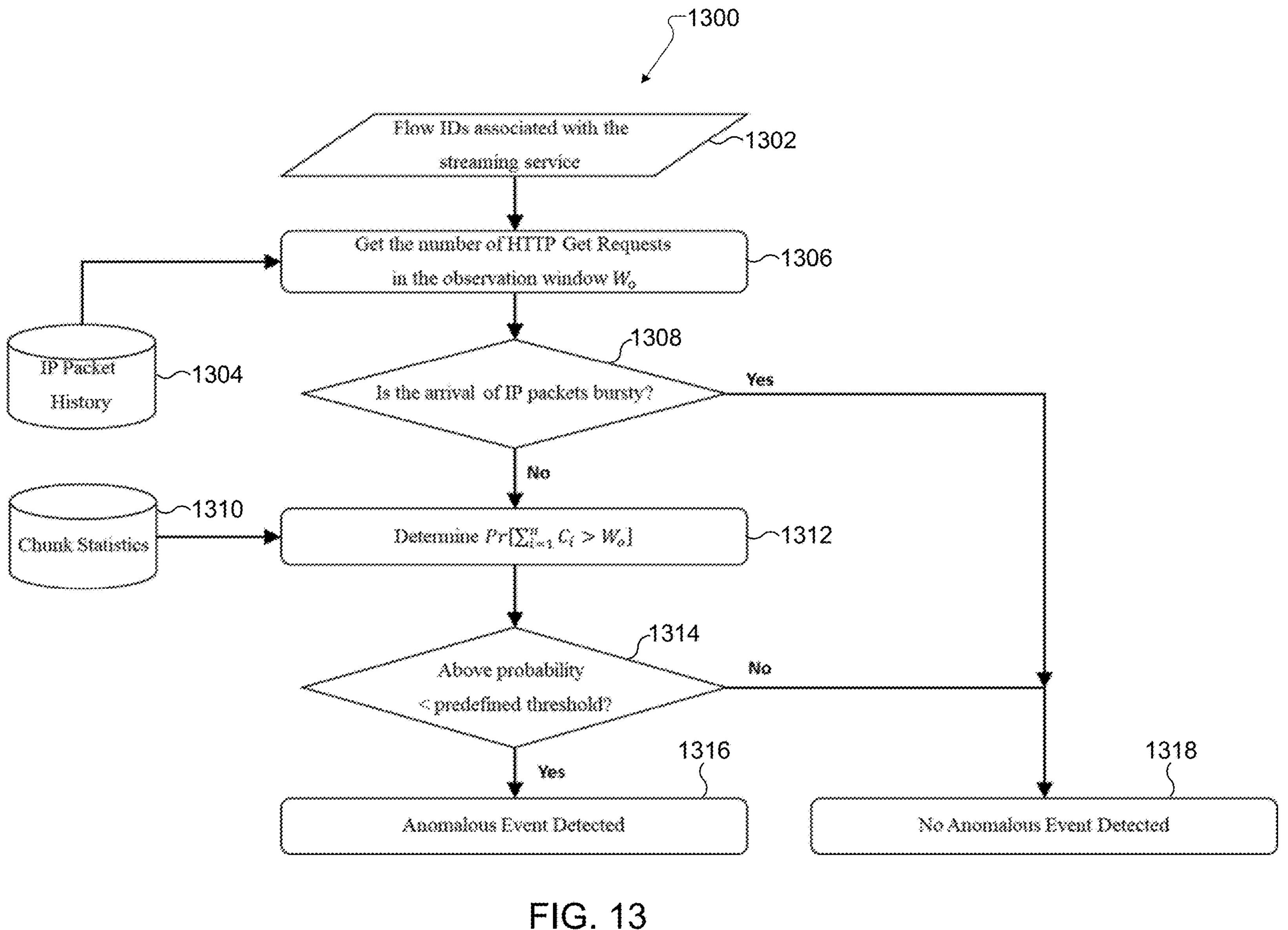
FIG. 13 illustrates an example method to estimate stall events based on statistics of HTTP Get Requests according to embodiments of the present disclosure.

FIG. 13 illustrates an example method to estimate stall events based on statistics of HTTP Get Requests 1300 according to embodiments of the present disclosure. An embodiment of the method illustrated in FIG. 13 is for illustration only. One or more of the components illustrated in FIG. 13 may be implemented in specialized circuitry configured to perform the noted functions or one or more of the components may be implemented by one or more processors executing instructions to perform the noted functions. Other embodiments of a method to estimate stall events based on statistics of HTTP Get Requests could be used without departing from the scope of this disclosure.

In the example of FIG. 13, the method begins at block 1302. At block 1302 the UE obtains the flows associated with a streaming service. At block 1306, from the IP packet history 1304, the UE obtains all HTTP GET Requests in the last $W_o$ time window. The HTTP GET Requests are uplink packets with considerably larger size compared to ACK packets. This is true for both TCP and QUIC/UDP type protocols. Hence, it may be easier to identify these packets from the rest of the uplink packets in the flow. At block 1308, the UE determines whether the arrival of the IP packets (HTTP GET Request responses) are bursty. Based on observation a stalling event does not occur when streaming traffic is bursty in nature. If the traffic is bursty, at block 1312, based on the HTTP GET Request response statistics the UE determines $$Pr\left[\sum_{i=1}^{n} C_i > W_o\right]$$

for the chunk statistics 1310. At step 1314 if the probability is less than a predefined threshold, the UE determines that there is an anomalous event at block 1316. If the probability is above the predefined threshold, the UE determines that there is not an anomalous event at block 1318.

Although FIG. 13 illustrates one example of a method to estimate stall events based on statistics of HTTP Get Requests 1300, various changes may be made to FIG. 13. For example, while shown as a series of steps, various steps in FIG. 13 could overlap, occur in parallel, occur in a different order, occur any number of times, be omitted, or replaced by other steps.

An anomalous event can also be detected using physical (PHY) layer throughput as well. For example, one approach to determine the physical layer throughput is through TB sizes which is shown in FIG. 14.

Figure 14:
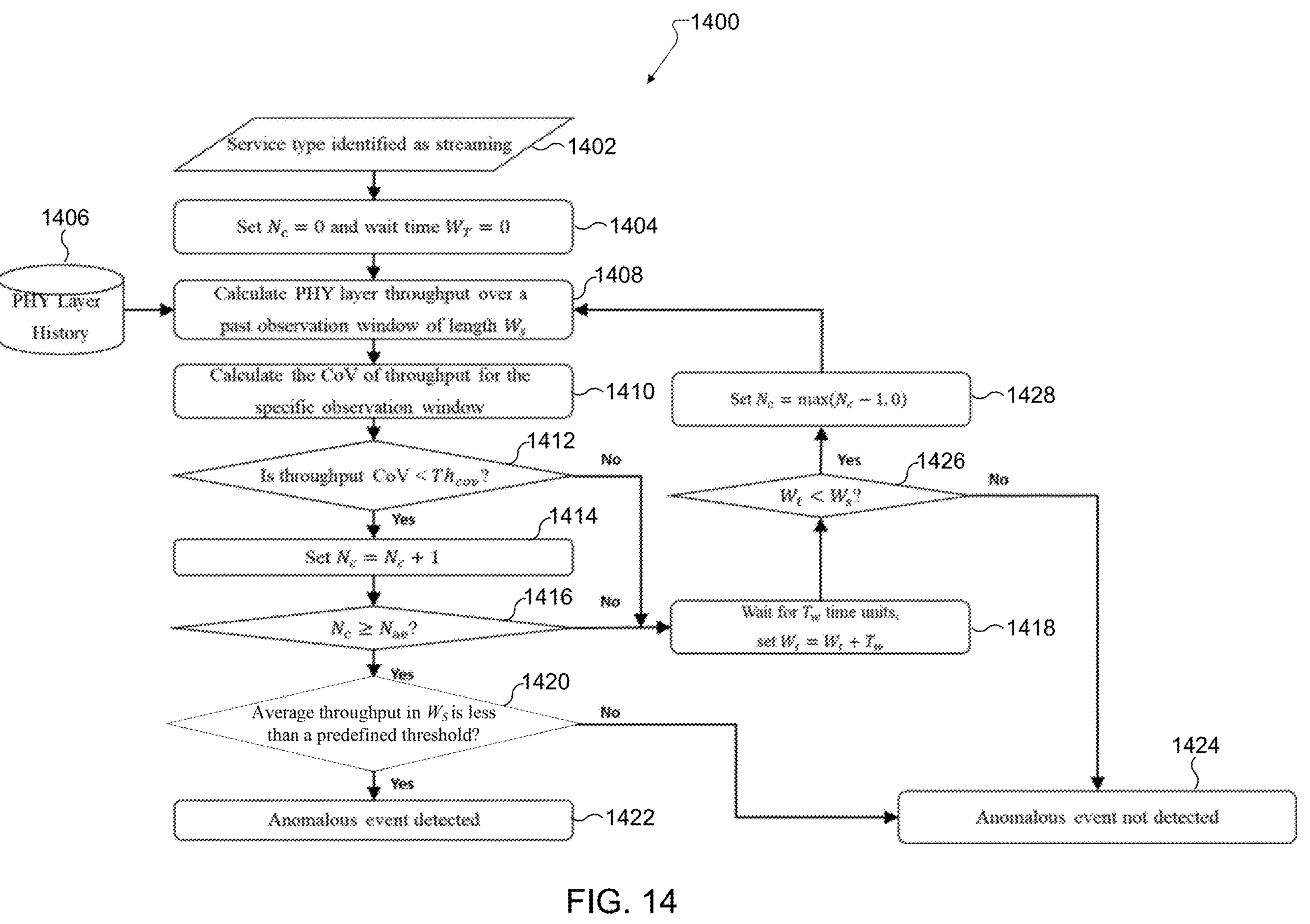
FIG. 14 illustrates an example method of detecting an anomalous event using physical layer throughput according to embodiments of the present disclosure.

FIG. 14 illustrates an example method of detecting an anomalous event using physical layer throughput 1400 according to embodiments of the present disclosure. An embodiment of the method illustrated in FIG. 14 is for illustration only. One or more of the components illustrated in FIG. 14 may be implemented in specialized circuitry configured to perform the noted functions or one or more of the components may be implemented by one or more processors executing instructions to perform the noted functions. Other embodiments of detecting an anomalous event using physical layer throughput could be used without departing from the scope of this disclosure.

In the example of FIG. 14, the method begins at block 1404 where the service type has previously been identified as streaming (block 1402). At blocks 1404 and 1408, the UE gets the PHY layer throughput from the PHY layer history 1406 over a specified past observation window $W_s$ time units, e.g., 10 seconds. Next, at block 1410 the UE calculates the CoV of the throughput and at block 1412 compares it to threshold $Th_{cov}$, which may be obtained using a data driven approach. If the CoV of throughput during $W_s$ is less than $Th_{cov}$, then at block 1414 the UE infers that bandwidth throttling may be occurring and increments the counter $N_c$. For more robust inference, the UE may compare the CoV of throughput every $W_t$ time units, e.g., 1 second (blocks 1418, 1426, and 1428). At block 1416, once the counter $N_c$ reaches the predefined threshold $N_a$e, where $N_{ae}$ should satisfy $N_{ae}W_T \leq W_s$, at block 1420, the UE makes an additional check regarding the average throughput over the past observation window of length $W_s$. If the average throughput is above a certain threshold, then it may be sufficient to say that although the UE is experiencing persistent throughput, the user QoE may not get affected as the data rate is high. Hence, the UE may declare the event to be not anomalous at block 1424. If the average throughput is below the threshold, the UE determines that that is an anomalous event at block 1422.

Although FIG. 14 illustrates one example of a method of detecting an anomalous event using physical layer throughput 1400, various changes may be made to FIG. 14. For example, while shown as a series of steps, various steps in FIG. 14 could overlap, occur in parallel, occur in a different order, occur any number of times, be omitted, or replaced by other steps.

As described regarding FIG. 7, once the AED detects the anomalous event, the UE may seek to estimate the available transport layer link throughput. This may be performed either via active probing or passive inference. In the case of active probing, the UE may perform an FTP download. To perform this download, the file may be hosted in a dedicated server. Another alternative is to use existing sites that allow such file download to determine the network capacity. If the available throughput is more than a threshold, then the UE may infer that bandwidth throttling is happening by the network.

Figure 15:
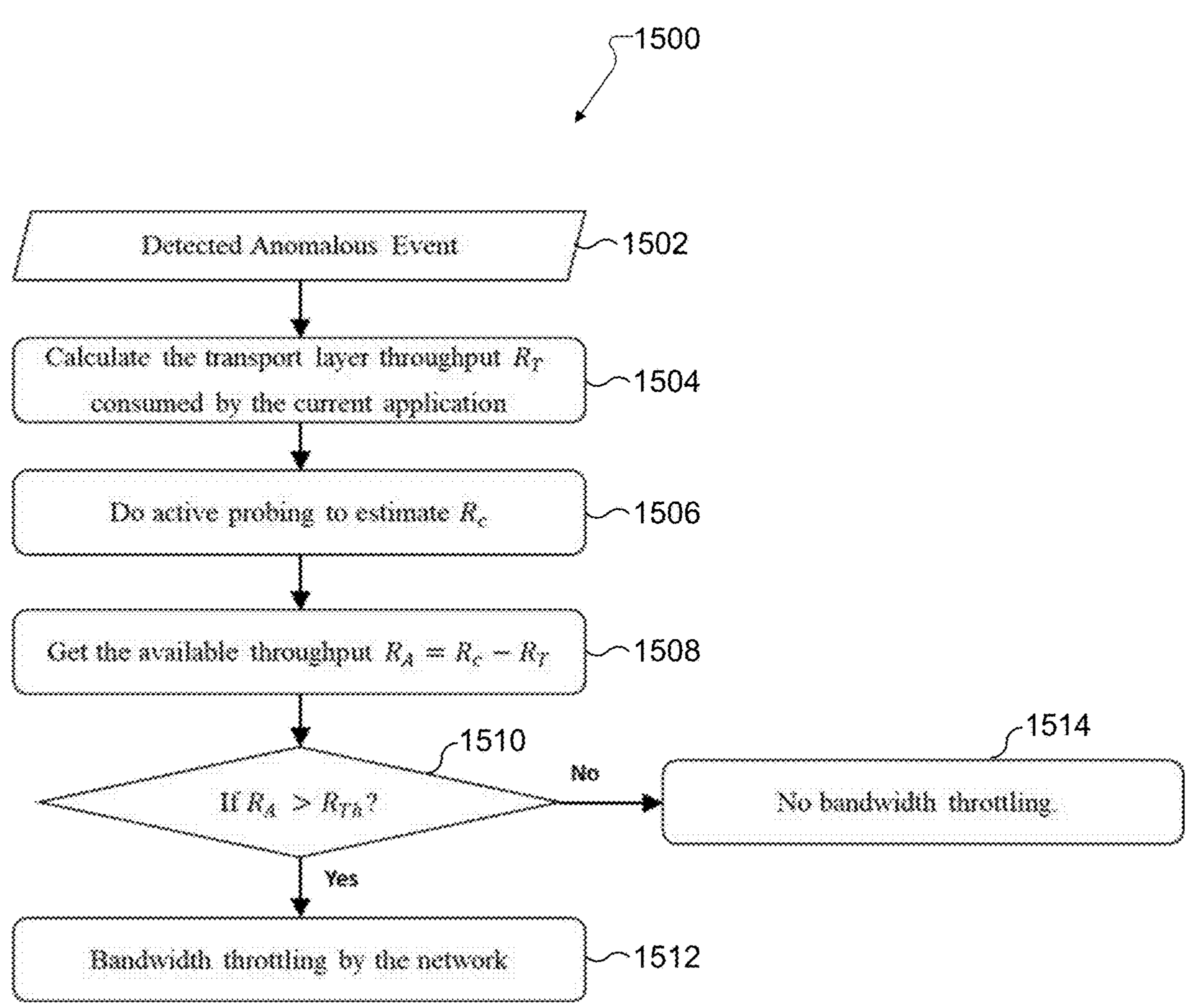
FIG. 15 illustrates an example method of throughput estimation using active probing according to embodiments of the present disclosure.

FIG. 15 illustrates an example method of throughput estimation using active probing 1500 according to embodiments of the present disclosure. An embodiment of the method illustrated in FIG. 15 is for illustration only. One or more of the components illustrated in FIG. 15 may be implemented in specialized circuitry configured to perform the noted functions or one or more of the components may be implemented by one or more processors executing instructions to perform the noted functions. Other embodiments of detecting an anomalous event using physical layer throughput could be used without departing from the scope of this disclosure.

The method of FIG. 15 begins at block 1504 after the detection of an anomalous event (block 1502). At block 1504, the UE calculates the transport layer throughput $R_T$ that the application is consuming. At block 1506, the UE performs active probing to estimate the network capacity $R_C$. At block 1508, the UE calculates the available throughput $R_A$. At block 1510 if the available throughput is greater than a threshold throughput $R_{Th}$, the UE determines at block 1512 that bandwidth throttling is occurring. If the available throughput is less than the threshold throughput, at block 1514 the UE determines that there is no bandwidth throttling.

Although FIG. 15 illustrates one example of a method of throughput estimation using active probing 1500, various changes may be made to FIG. 15. For example, while shown as a series of steps, various steps in FIG. 15 could overlap, occur in parallel, occur in a different order, occur any number of times, be omitted, or replaced by other steps.

For the embodiment described in FIG. 8, the UE may estimate the network load in terms of the number of occupied resource blocks to determine bandwidth throttling. The UE may obtain this information from logs related to the PHY parameters. A few standalone methods are presented below. Any combination of the methods can be used to estimate the available bandwidth. The methods are as follows:

1. Active probing: Similar as described previously herein, the UE may start an FTP download. During the active probing phase, the UE determines the average number of PRBs that are being allocated by the BS. If the BS allocates a significantly higher amount than used for the running app, then the UE may infer that the BS is not heavily loaded and performing active throttling. The advantage of this approach is that it is a more reliable detection of throttling. However, the disadvantage is network intrusion and higher UE power consumption.

2. PRB utilization by decoding all PDCCHs: The resource allocation information for the scheduled users in a slot are transmitted in the PDCCH that is transmitted on a specific control resource set (CORSET). In a normal scenario, the UE monitors a set of CORSETs to blindly decode the transmitted DCI, which contains scheduling information such as frequency and time domain resource assignments for the UE, MCS, TB size, etc. Instead of searching over specific CORSETs, the UE may try to search over all CORSETs to get the DCIs transmitted to the other users in the network. From the resource allocation fields of the DCIs, the device may be able to determine the fraction of PRBs used by the network. The advantage of this method is that it is passive and avoids network intrusion.
3. PRB utilization estimation from radio channel condition: Reference-signal-received-quality (RSRQ) measured using CSI-RS symbols indicates the number of resources used in the network. This RSRQ is inversely proportional to the resource block usage in the serving cell. For a single antenna port and equal power allocation across PRBs, the RSRQ is defined as $$RSRQ = \frac{N_{RB} RSRP}{N_{csi}^{sc} N_{RB}\, RSRP + (12 - N_{csi}^{sc}) a_{rb} N_{RB} + (I_p + \sigma_n^2)},$$

where $$N_{csi}^{sc}$$

is the number of resource elements on an OFDM symbol used for CSI measurement, $N_{RB}$ is the number of PRBs each with 12 subcarriers, $a_{rb}$ is the fraction of active PRBs, $$(I_p + \sigma_n^2)$$

is the total interference and noise power across the measurement bandwidth, and all power terms are in linear scale. For a given received-signal-reference-power (RSRP), higher $a_{rb}$ leads to lower RSRQ. Hence, it is theoretically possible to infer $a_{rb}$ from RSRQ through a proper mapping. This mapping can be learned using a data-driven approach. The advantages of inferring the PRB utilization using this approach are the non-intrusiveness and no additional measurements, as RSRQ is already present at the UE from CSI reporting.

Figure 16:
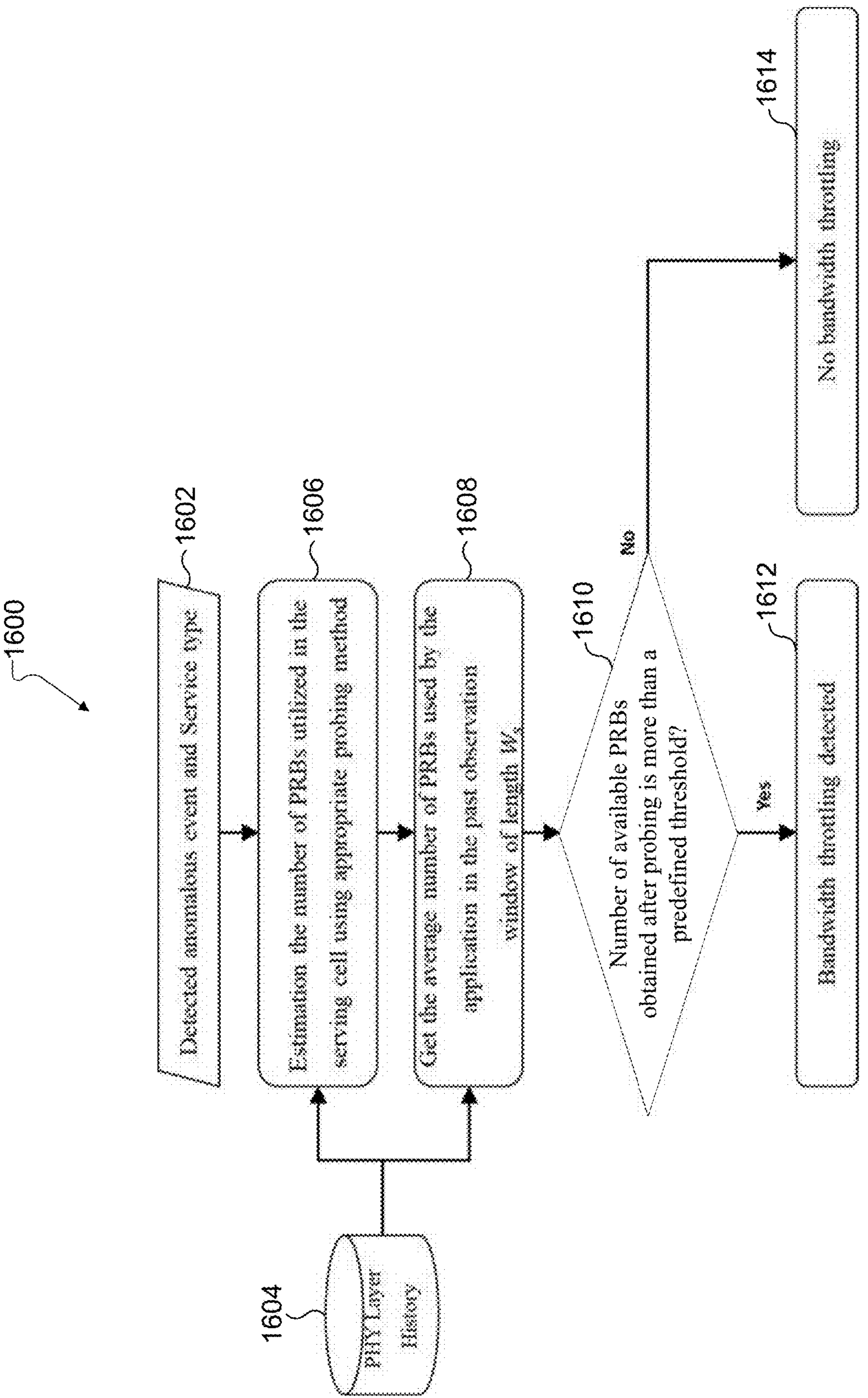
FIG. 16 illustrates an example method to determine the fraction of PRBs utilized in a serving cell according to embodiments of the present disclosure.

FIG. 16 illustrates an example method to determine the fraction of PRBs utilized in a serving cell 1600 according to embodiments of the present disclosure. An embodiment of the method illustrated in FIG. 16 is for illustration only. One or more of the components illustrated in FIG. 16 may be implemented in specialized circuitry configured to perform the noted functions or one or more of the components may be implemented by one or more processors executing instructions to perform the noted functions. Other embodiments to determine the fraction of PRBs utilized in a serving cell could be used without departing from the scope of this disclosure.

The method of FIG. 16 begins at block 1606 after the detection of an anomalous event and determination of the service type (block 1602). At blocks 1606 and 1608, using PHY layer history 1604, using any combination of the methods presented herein, the UE determines the average number of available PRBs as the difference between the number of PRBs used during probing and the number of PRBs used by the application. At block 1610, if the difference is more than a predefined threshold, the UE may declare that the network throttling the bandwidth for the user at block 1612. Otherwise, at block 1614 the UE may determine that there is no bandwidth throttling.

Although FIG. 16 illustrates one example of a method to determine the fraction of PRBs utilized in a serving cell 1600, various changes may be made to FIG. 16. For example, while shown as a series of steps, various steps in FIG. 16 could overlap, occur in parallel, occur in a different order, occur any number of times, be omitted, or replaced by other steps.

Figure 17:
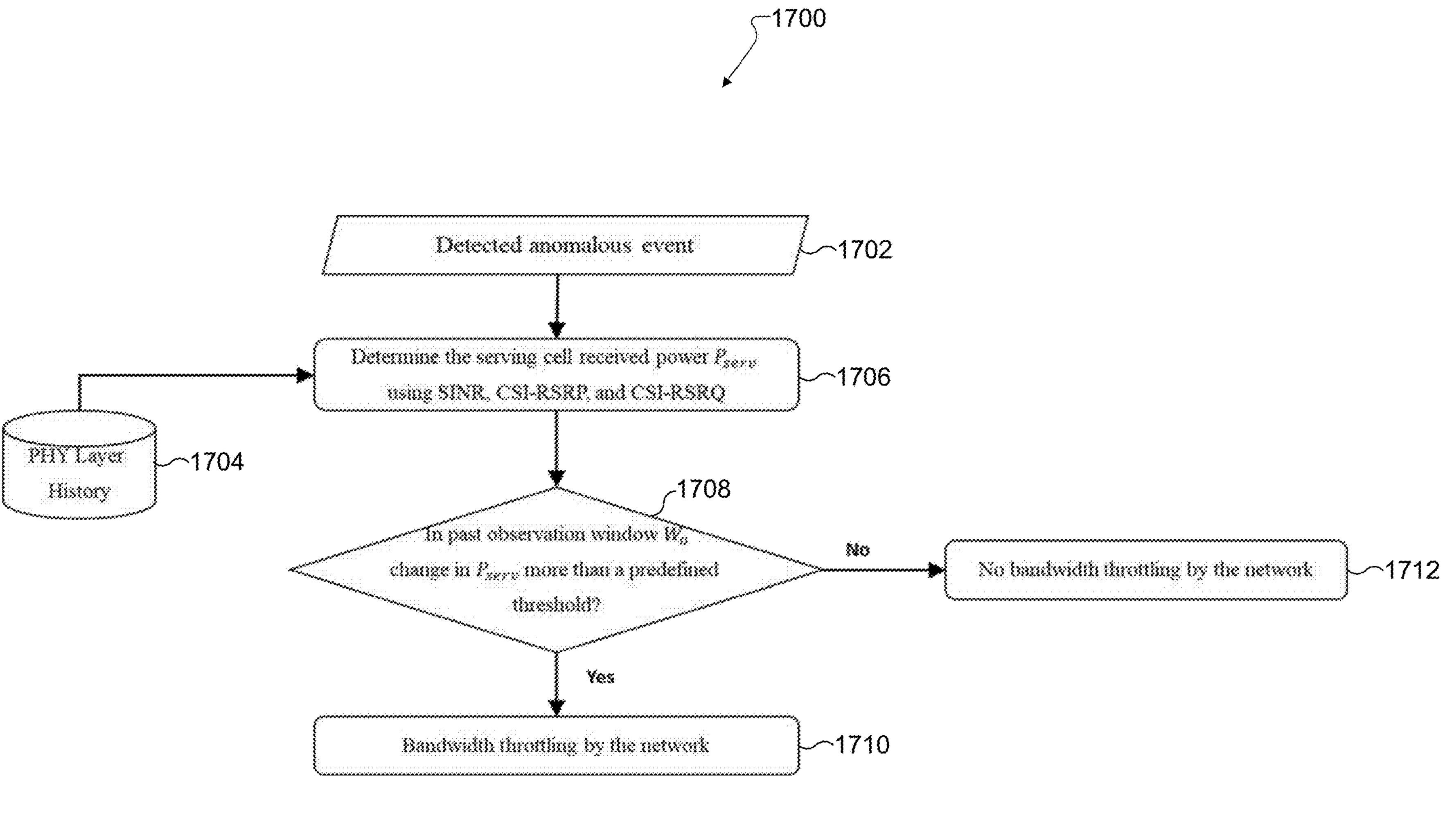
FIG. 17 illustrates another example method to determine the fraction of PRBs utilized in a serving cell according to embodiments of the present disclosure.

FIG. 17 illustrates another example method to determine the fraction of PRBs utilized in a serving cell 1700 according to embodiments of the present disclosure. An embodiment of the method illustrated in FIG. 17 is for illustration only. One or more of the components illustrated in FIG. 17 may be implemented in specialized circuitry configured to perform the noted functions or one or more of the components may be implemented by one or more processors executing instructions to perform the noted functions. Other embodiments to determine the fraction of PRBs utilized in a serving cell could be used without departing from the scope of this disclosure.

The method of FIG. 17 begins at block 1706 after the detection of an anomalous event (block 1702). At block 1706, based on PHY layer history 1704, the UE observes the fluctuation in the received power from the serving cell across the entire measurement bandwidth that is given as $$P_{serv} = N_{csi}^{sc} N_{RB} RSRP + (12 - N_{csi}^{sc}) a_{rb} N_{RB}.$$

The concept of this embodiment is that if in the current slot no downlink data is scheduled, then $$P_{serv} = N_{csi}^{sc} N_{RB} RSRP,$$

which is its minimum value. However, once PRBs are being allocated to the users, the UE observes an increase in $P_{serv}$. The UE constantly monitors the aforementioned quantity and at block 1708, if the UE observes an increase in $P_{serv}$ more than a predefined threshold, then it may infer that some PRBs that were unused earlier are being allocated to a recently active user in the network. This is a confirmation that earlier the network was allocating a restricted number of PRBs to the user, and the UE may determine at block 1710 that bandwidth throttling is occurring. Otherwise, at block 1712 the UE may determine that there is no bandwidth throttling.

Although FIG. 17 illustrates one example of a method to determine the fraction of PRBs utilized in a serving cell 1700, various changes may be made to FIG. 17. For example, while shown as a series of steps, various steps in FIG. 17 could overlap, occur in parallel, occur in a different order, occur any number of times, be omitted, or replaced by other steps.

In one embodiment a UE detects anomalous events once it is determined that the UE is serving as a Wi-Fi Access Point (AP) using hotspot capabilities.

Figure 18:
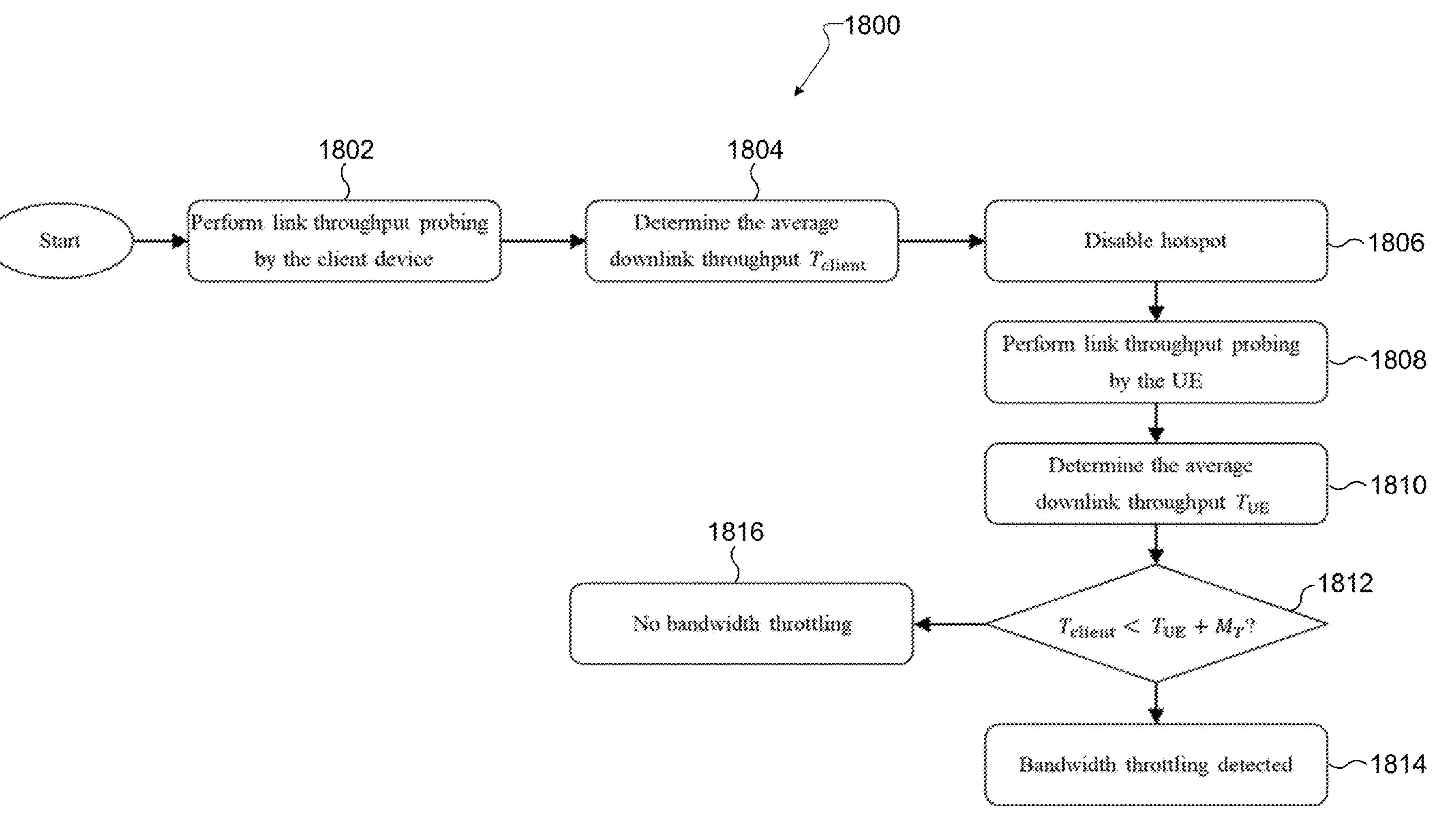
FIG. 18 illustrates an example method of detecting bandwidth throttling for a hotspot client device according to embodiments of the present disclosure.

FIG. 18 illustrates an example method of detecting bandwidth throttling for a hotspot client device 1800 according to embodiments of the present disclosure. An embodiment of the method illustrated in FIG. 18 is for illustration only. One or more of the components illustrated in FIG. 18 may be implemented in specialized circuitry configured to perform the noted functions or one or more of the components may be implemented by one or more processors executing instructions to perform the noted functions. Other embodiments of detecting bandwidth throttling for a hotspot client device could be used without departing from the scope of this disclosure.

The method of FIG. 18 begins at block 1802. At block 1802, the the UE may negotiate with a client device to do active network probing by starting an FTP download. During this period, at block 1804 the UE calculates the average downlink throughput. Once the probing by the client device ends, at block 1806 the UE may disable the hotspot and at block 1808 the UE may start its probing by starting another FTP download. After calculating the UE's downlink throughput at block 1810, at block 1812, if it is observed that the downlink throughput during the UE probing is significantly more compared to the downlink throughput during the client device probing, then at block 1814 the UE may declare that bandwidth throttling is occurring. Otherwise, at block 1816, the UE may determine that there is no bandwidth throttling.

Although FIG. 18 illustrates one example of a method of detecting bandwidth throttling for a hotspot client device 1800, various changes may be made to FIG. 18. For example, while shown as a series of steps, various steps in FIG. 18 could overlap, occur in parallel, occur in a different order, occur any number of times, be omitted, or replaced by other steps.

Figure 19:
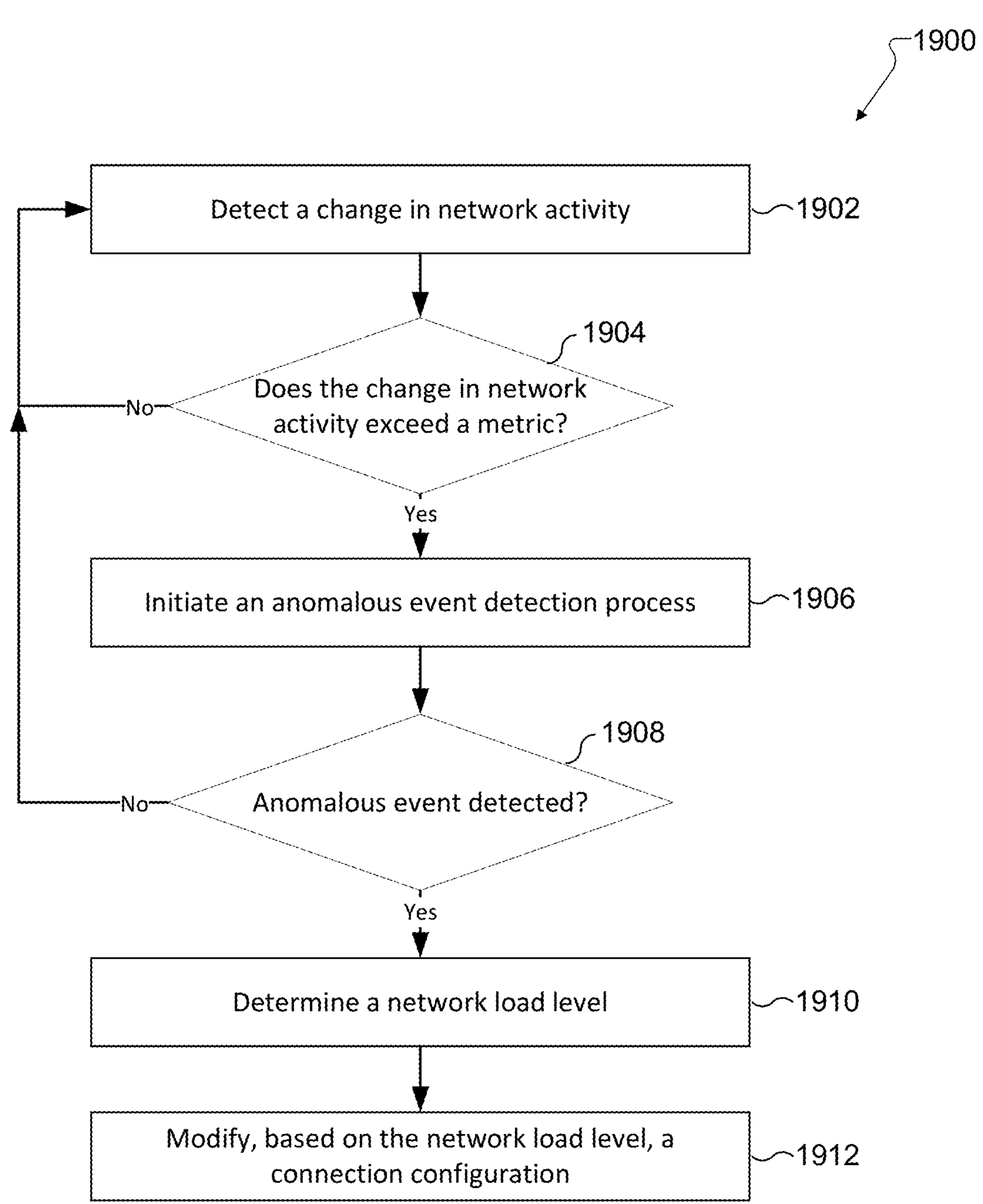
FIG. 19 illustrates an example method of detecting bandwidth throttling according to embodiments of the present disclosure.

FIG. 19 illustrates an example method of detecting bandwidth throttling 1900 according to embodiments of the present disclosure. An embodiment of the method illustrated in FIG. 19 is for illustration only. One or more of the components illustrated in FIG. 19 may be implemented in specialized circuitry configured to perform the noted functions or one or more of the components may be implemented by one or more processors executing instructions to perform the noted functions. Other embodiments of detecting bandwidth throttling could be used without departing from the scope of this disclosure.

The method of FIG. 19 begins at step 1902. At step 1902, a UE, such as such as UE 116 of FIG. 1 detects a change in network activity. At step 1904, the UE determines if the change in network activity exceeds a metric. If the change in network activity exceeds the metric, then at step 1906 the UE initiates an anomalous event detection process. At step 1908, if an anomalous event is detected, then at step 1910, the UE determines a network load level. Finally, at step 1912, the UE modifies, based on the network load level, a connection configuration of the UE.

Although FIG. 19 illustrates one example of a method of detecting bandwidth throttling 1900, various changes may be made to FIG. 19. For example, while shown as a series of steps, various steps in FIG. 19 could overlap, occur in parallel, occur in a different order, occur any number of times, be omitted, or replaced by other steps.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claim scope. The scope of patented subject matter is defined by the claims.

What is claimed is:

1. A user equipment (UE) comprising:

a transceiver configured to perform network activity for the UE; and a processor operably coupled to the transceiver, the processor configured to:

determine whether a change in network activity for the UE exceeds a metric;

upon a determination that the metric is exceeded:

initiate an anomalous event detection process; and determine whether an anomalous event is detected;

upon detection of an anomalous event, determine a network load level; and perform, based on the determined network load level, at least one of:

switching a radio access technology (RAT) of the UE from a first RAT to a second RAT, or connecting the UE to a virtual private network (VPN).

2. The UE of claim 1, wherein to switch the RAT of the UE from the first RAT to the second RAT, the processor is further configured to switch the UE from a cellular network to a Wi-Fi network.

3. The UE of claim 1, wherein the processor is further configured to:

after initiation of the anomalous event detection process, identify a service type of the network activity;

determine IP packet statistics related to the identified service type, wherein the anomalous event detection process is based on the determined IP packet statistics;

determine whether an available link throughput is greater than a threshold; and if the available link throughput is greater than the threshold, determine that the network load level is light.

4. The UE of claim 3, wherein the processor is further configured to determine a transport layer throughput corresponding with the service type, wherein the available link throughput is based on the determined transport layer throughput.

5. The UE of claim 3, wherein:

the processor is further configured to determine physical (PHY) layer information related to the service type;

the anomalous event detection process is based on the PHY layer information; and the network load level is determined based on the PHY layer information.

6. The UE of claim 1, wherein the processor is further configured to:

after initiation of the anomalous event detection process, query an application process regarding a status of a streaming service buffer; and upon a determination that data in the streaming service buffer is less than a stall threshold, determine that an anomalous event is detected.

7. The UE of claim 1, wherein the processor is further configured to:

after initiation of the anomalous event detection process, determine a coefficient of variation (CoV) of transport layer throughput for a streaming service;

determine whether the CoV is less than a CoV threshold; and upon on a determination that the CoV is less than the CoV threshold, determine that an anomalous event is detected.

8. The UE of claim 1, wherein the processor is further configured to:

after initiation of the anomalous event detection process, determine a coefficient of variation (CoV) of physical (PHY) layer throughput for a streaming service;

determine whether the CoV is less than a CoV threshold; and upon on a determination that the CoV is less than the CoV threshold, determine that an anomalous event is detected.

9. The UE of claim 1, wherein the processor is further configured to:

after initiation of the anomalous event detection process, determine if an arrival of internet protocol (IP) packets is bursty;

if the arrival of IP packets is not bursty, estimate, based on a number of HTTP GET Request response statistics, a status of a streaming service buffer; and if the estimated status is that data in the streaming service buffer is less than a stall threshold, determine that an anomalous event is detected.

10. The UE of claim 1, wherein:

the transceiver is further configured to:

receive, from a hotspot client of the UE, an average downlink throughput of the hotspot client; and the processor is further configured to:

determine an average downlink throughput of the UE;

determine whether the average downlink throughput of the UE exceeds the average downlink throughput of the hotspot client by more than a threshold; and upon a determination that the average downlink throughput of the UE exceeds the average downlink throughput of the hotspot client by more than the threshold, modify the connection configuration of the UE.

11. A method of operating a user equipment (UE), the method comprising:

determining whether a change in network activity for the UE exceeds a metric;

upon determining that the metric is exceeded:

initiating an anomalous event detection process; and determining whether an anomalous event is detected;

upon detection of an anomalous event, determining a network load level; and based on the determined network load level, performing at least one of:

switching a radio access technology (RAT) of the UE from a first RAT to a second RAT, or connecting the UE to a virtual private network (VPN).

12. The method of claim 11, wherein switching the RAT of the UE from a first RAT to a second RAT comprises switching the UE from a cellular network to a Wi-Fi network.

13. The method of claim 11, further comprising:

after initiating the anomalous event detection process, identifying a service type of the network activity;

determining IP packet statistics related to the identified service type, wherein the anomalous event detection process is based on the determined IP packet statistics;

determining whether an available link throughput is greater than a threshold; and if the available link throughput is greater than the threshold, determining that the network load level is light.

14. The method of claim 13, further comprising determining a transport layer throughput corresponding with the service type, wherein the available link throughput is based on the determined transport layer throughput.

15. The method of claim 13, further comprising determining physical (PHY) layer information related to the service type, wherein:

the anomalous event detection process is based on the PHY layer information; and the network load level is determined based on the PHY layer information.

16. The method of claim 11, further comprising:

after initiation of the anomalous event detection process, querying an application process regarding a status of a streaming service buffer; and upon a determination that data in the streaming service buffer is less than a stall threshold, determining that an anomalous event is detected.

17. The method of claim 11, further comprising:

after initiating the anomalous event detection process, determining a coefficient of variation (CoV) of transport layer throughput for a streaming service;

determining whether the CoV is less than a CoV threshold; and upon on a determination that the CoV is less than the CoV threshold, determining that an anomalous event is detected.

18. The method of claim 11, further comprising:

after initiating the anomalous event detection process, determining a coefficient of variation (CoV) of physical (PHY) layer throughput for a streaming service;

determining whether the CoV is less than a CoV threshold; and upon on a determination that the CoV is less than the CoV threshold, determining that an anomalous event is detected.

19. The method of claim 11, further comprising:

after initiating the anomalous event detection process, determining if an arrival of internet protocol (IP) packets is bursty;

if the arrival of IP packets is not bursty, estimating, based on a number of HTTP GET Request response statistics, a status of a streaming service buffer; and if the estimated status is that data in the streaming service buffer is less than a stall threshold, determining that an anomalous event is detected.

20. The method of claim 11, further comprising:

receiving, from a hotspot client of the UE, an average downlink throughput of the hotspot client;

determining an average downlink throughput of the UE;

determining whether the average downlink throughput of the UE exceeds the average downlink throughput of the hotspot client by more than a threshold; and upon a determination that the average downlink throughput of the UE exceeds the average downlink throughput of the hotspot client by more than the threshold, modifying the connection configuration of the UE.

* * * * *